(12) United States Patent
Zhang et al.

(10) Patent No.: US 11,695,742 B2
(45) Date of Patent: *Jul. 4, 2023

(54) SECURITY IMPLEMENTATION METHOD, DEVICE, AND SYSTEM

(71) Applicant: Huawei Technologies Co., Ltd., Shenzhen (CN)

(72) Inventors: Bo Zhang, Shenzhen (CN); Rong Wu, Shenzhen (CN); Lu Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/321,964

(22) Filed: May 17, 2021

(65) Prior Publication Data

US 2021/0273923 A1   Sep. 2, 2021

Related U.S. Application Data

(63) Continuation of application No. 16/521,171, filed on Jul. 24, 2019, now Pat. No. 11,025,597, which is a
(Continued)

(30) Foreign Application Priority Data

Jan. 24, 2017   (CN) .......................... 201710055275.9

(51) Int. Cl.
*H04L 29/06*   (2006.01)
*H04L 9/40*   (2022.01)
(Continued)

(52) U.S. Cl.
CPC ........ *H04L 63/0428* (2013.01); *H04L 9/0861* (2013.01); *H04L 63/20* (2013.01);
(Continued)

(58) Field of Classification Search
None
See application file for complete search history.

(56) References Cited

U.S. PATENT DOCUMENTS

| | | | | |
|---|---|---|---|---|
| 7,913,289 B2* | 3/2011 | Chen | ................ | H04N 21/43607 726/1 |
| 8,041,335 B2* | 10/2011 | Khetawat | .............. | H04W 92/12 455/404.1 |

(Continued)

FOREIGN PATENT DOCUMENTS

| | | |
|---|---|---|
| CN | 101188851 A | 5/2008 |
| CN | 102958052 A | 3/2013 |

(Continued)

OTHER PUBLICATIONS

"3rd Generation Partnership Project; Technical Specification Group Services and System Aspects; Procedures for the 5G System; Stage 2; (Release 15)," 3GPP TS 23.502, V0.0.0, Jan. 2017, 13 pages.
(Continued)

*Primary Examiner* — Maung T Lwin
(74) *Attorney, Agent, or Firm* — Conley Rose, P.C.

(57) ABSTRACT

A security implementation method includes obtaining, by a first device, a security policy of a session and at least one key, and sending, by the first device, protected data to a second device, where the protected data is obtained by protecting security of session data of the session using the at least one key based on the security policy of the session, and the second device is configured to restore the protected data using the at least one key based on the security policy to obtain the session data, where when the first device is a terminal device, the second device is an access network node or a user plane node, or when the first device is an access network node or a user plane node, the second device is a terminal device.

18 Claims, 15 Drawing Sheets

Related U.S. Application Data continuation of application No. PCT/CN2018/071818, filed on Jan. 8, 2018.

(51) Int. Cl.
| | | |
|---|---|---|
| *H04L 9/08* | (2006.01) | |
| *H04L 67/14* | (2022.01) | |
| *H04W 12/033* | (2021.01) | |
| *H04W 12/041* | (2021.01) | |
| *H04W 12/106* | (2021.01) | |

(52) U.S. Cl.
CPC ......... *H04L 67/14* (2013.01); *H04W 12/033* (2021.01); *H04W 12/041* (2021.01); *H04W 12/106* (2021.01); *H04L 2209/80* (2013.01)

(56) References Cited

U.S. PATENT DOCUMENTS

| | | | | |
|---|---|---|---|---|
| 8,336,105 | B2* | 12/2012 | Hartung | H04L 9/0825 726/32 |
| 8,910,241 | B2 | 12/2014 | Pollutro et al. | |
| 8,948,395 | B2 | 2/2015 | Narayanan et al. | |
| 9,942,034 | B2* | 4/2018 | Le Saint | H04L 9/0825 |
| 10,454,674 | B1* | 10/2019 | Bar-El | H04L 63/123 |
| 2003/0023847 | A1* | 1/2003 | Ishibashi | G11B 20/0021 713/169 |
| 2003/0033518 | A1* | 2/2003 | Faccin | H04L 63/04 713/153 |
| 2003/0046238 | A1 | 3/2003 | Nonaka et al. | |
| 2007/0248085 | A1* | 10/2007 | Volpano | H04L 63/0272 370/389 |
| 2008/0052539 | A1* | 2/2008 | MacMillan | G06F 21/78 713/193 |
| 2009/0025060 | A1 | 1/2009 | Mukherjee et al. | |
| 2013/0311777 | A1 | 11/2013 | Kolar Sundar et al. | |
| 2015/0032905 | A1 | 1/2015 | Celebi et al. | |
| 2015/0271672 | A1 | 9/2015 | Ding et al. | |
| 2015/0304286 | A1 | 10/2015 | Kolar Sundar et al. | |
| 2016/0112381 | A1* | 4/2016 | Bhattacharyya | H04L 63/0428 713/171 |
| 2016/0164875 | A1 | 6/2016 | Zhang et al. | |
| 2016/0344635 | A1 | 11/2016 | Lee et al. | |
| 2016/0380984 | A1 | 12/2016 | Johnson et al. | |

FOREIGN PATENT DOCUMENTS

| | | |
|---|---|---|
| CN | 103763697 A | 4/2014 |
| CN | 104954125 A | 9/2015 |
| EP | 2104270 A1 | 9/2009 |
| KR | 20160013151 A | 2/2016 |
| RU | 2495532 C2 | 10/2013 |
| WO | 2015012933 A2 | 1/2015 |
| WO | 2016162502 A1 | 10/2016 |

OTHER PUBLICATIONS

"3rd Generation Partnership Project; Technical Specification Group Services and System Aspects; Study on Architecture for Next Generation System (Release 14)," 3GPP TR 23.799, V14.0.0, Dec. 2016, 522 pages.

"3rd Generation Partnership Project; Technical Specification Group Services and System Aspects; Study on the security aspects of the next generation system (Release 14)," 3GPP TR 33.899, V0.6.0, Nov. 2016, 375 pages.

Huawei, et al., "PCR of User Plane Security Protection," 3GPP TSG SA WG3 (Security) Meeting #84 S3-161002, Chennai, India, revision of S3-13abcd, Jul. 25-29, 2016, 12 pages.

Alcatel-Lucent, et al., "PRACH for LC-MTC," 3GPP TSG RAN WG1 Meeting #80bis R1-151234, Belgrade, Serbia, Apr. 20-24, 2015, 4 pages.

Huawei., et al,. "PCR of User Plane Security Protection," 3GPP TSG SA WG3 (Security) Meeting #84 S3-161197, Chennai, India, revision of S3-1610023, Jul. 25-29, 2016, 12 pages.

Ericsson, et al., "GPRS Kc handling", 3GPP TSG SA WG3 Security—S3#58 S3-100248 (revision of S3-100039), Change Request 33.401 CR 0381, Current version: 8.6.0, Feb. 2010, 10 pages.

3GPP TSG-HAN WG3 Meeting #62, R3-083577, "Changes to T836.300 agreed in RAN3#61bis and RAN3#62," Ericsson, Prague, Czech Republic, Nov. 10-14, 2008, 146 pages.

\* cited by examiner

| Version | Protocol | Reserved bit | Extension header flag | Sequence number flag | Non-PDU number flag |
|---|---|---|---|---|---|
| Message type | | | | | Message length |
| Tunnel identifier | | | | | |
| Sequence number | | | | Non-PDU number | Next extension header type |

FIG. 8

| Version | Packet header length | Type of service | Total length | |
|---|---|---|---|---|
| Identifier | | | Flag | Segment offset |
| Lifetime | | Protocol | Header checksum | |
| Source address | | | | |
| Destination address | | | | |
| Options | | | | |
| Data | | | | |

SECURITY IMPLEMENTATION METHOD, DEVICE, AND SYSTEM

CROSS-REFERENCE TO RELATED APPLICATIONS

This application is a continuation of U.S. patent application Ser. No. 16/521,171, filed on Jul. 24, 2019, which is a continuation of International Patent Application No. PCT/CN2018/071818, filed on Jan. 8, 2018, which claims priority to Chinese Patent Application No. 201710055275.9, filed on Jan. 24, 2017. All of the aforementioned patent applications are hereby incorporated by reference in their entireties.

TECHNICAL FIELD

The present disclosure relates to the communications field, and in particular, to a security implementation method, a device, and a system.

BACKGROUND

In an existing network security architecture, data security protection is performed in a hop-by-hop manner. In other words, security protection is performed segment by segment. Using data transmission in a link "terminal device—base station—serving gateway—Packet Data Network (PDN) gateway" as an example, security protection is performed once between the terminal device and the base station, security protection is performed once between the base station and the serving gateway, and security protection is performed once between the serving gateway and the PDN gateway. As can be seen, in a data transmission process, if a problem occurs on an intermediate node, data leakage may be caused. In addition, when data is encrypted and restored for a plurality of times in the data transmission process, resource waste is also caused.

SUMMARY

A technical problem to be resolved by embodiments of the present disclosure is to provide a security implementation method, a device, and a system to implement end-to-end protection of data.

According to a first aspect, an embodiment of the present disclosure provides a security implementation method, including obtaining, by a first device, a security policy of a session and at least one key; and sending, by the first device, protected data to a second device, where the protected data is obtained by protecting security of session data of the session using the at least one key based on the security policy of the session, and where the second device is configured to restore the protected data using the at least one key based on the security policy to obtain the session data, where when the first device is a terminal device, the second device is an access network node or a user plane node, or when the first device is an access network node or a user plane node, the second device is a terminal device.

With reference to the first aspect, in a first possible implementation of the first aspect, the at least one key includes a first key and a second key, where the first key is used to protect first security of the session, and where the second key is used to protect second security of the session.

With reference to the first possible implementation of the first aspect, in a second possible implementation of the first aspect, the security policy is used to indicate a protection mode of the session data, and the protection mode is protecting the first security of the session data using the first key based on a first security algorithm, or protecting the second security of the session data using the second key based on a second security algorithm, or protecting the first security of the session data using the first key based on the first security algorithm and protecting the second security of the session data using the second key based on the second security algorithm.

With reference to the second possible implementation of the first aspect, in a third possible implementation of the first aspect, the security policy is further used to indicate at least one of the first security algorithm, the second security algorithm, a key length, or a key update time.

With reference to the third possible implementation of the first aspect, in a fourth possible implementation of the first aspect, the key length includes a first key length and/or a second key length, where the first key length is used to represent a length of the first key, and where the second key length is used to represent a length of the second key.

With reference to the third possible implementation of the first aspect, in a fifth possible implementation of the first aspect, the key update time includes a first key update time and/or a second key update time, where the first key update time is used to represent an update time of the first key, and where the second key update time is used to represent an update time of the second key.

With reference to any one of the foregoing possible implementations of the first aspect, in a sixth possible implementation of the first aspect, the first security is confidentiality, and the second security is integrity.

With reference to the sixth possible implementation of the first aspect, in a seventh possible implementation of the first aspect, the protected data further includes a parameter field, and the parameter field includes at least one of a first identifier field, a second identifier field, or a third identifier field, where the first identifier field is used to indicate that a current message is a session message, where the second identifier field is used to indicate at least one of a service identifier, a session identifier, a bearer identifier, a flow identifier, or a slice identifier, and where the third identifier is used to indicate the protection mode of the session.

With reference to the seventh possible implementation of the first aspect, in an eighth possible implementation of the first aspect, the parameter field further includes at least one of a length field, a packet field, and a Media Access Control (MAC) field, where the length field is used to indicate a length of the parameter field, where the packet field is used to indicate a length of a packet when the packet is encrypted, and where the MAC field is used to indicate that integrity of the session is protected.

With reference to any one of the foregoing possible implementations of the first aspect, in a ninth possible implementation of the first aspect, when the second device is the access network node, the obtaining, by a first device, the security policy is obtaining, by the first device, the security policy from a policy controller.

With reference to the ninth possible implementation of the first aspect, in a tenth possible implementation of the first aspect, the obtaining, by the first device, the security policy from a policy controller includes: sending, by the first device, a first request to the access network node, where the first request includes a security capability of the first device and a service security requirement; and receiving, by the first device, the security policy returned by the access network node, where the security policy is obtained by the access network node by sending a second request to the policy controller, and where the second request is generated by the access network node based on the first request and includes the security capability of the first device, the service security requirement, and a security requirement of the access network node.

With reference to the ninth possible implementation of the first aspect, in an eleventh possible implementation of the first aspect, the obtaining, by the first device, the security policy from a policy controller includes: sending, by the first device, a first request to the access network node, where the first request includes a security capability of the first device and a service security requirement; and receiving, by the first device, the security policy returned by the access network node, where the security policy is obtained by the access network node by forwarding a second request to the policy controller through at least one network element, and where the second request is generated by the access network node based on the first request and includes the security capability of the first device, the service security requirement, and a security requirement of the access network node.

With reference to the eleventh possible implementation of the first aspect, in a twelfth possible implementation of the first aspect, the at least one network element includes a session management network element, or the at least one network element includes a session management network element or a mobility management entity.

With reference to the ninth possible implementation of the first aspect, in a thirteenth possible implementation of the first aspect, the obtaining, by the first device, the security policy from a policy controller includes: sending, by the first device, a first request to the access network node, where the first request includes a security capability of the first device and a service security requirement; and receiving, by the first device, the security policy returned by the access network node, where the security policy is generated by the access network node based on a core network security policy and a security capability of the access network node, and where the core network security policy is generated by the policy controller based on the first request forwarded by the access network node.

With reference to any one of the foregoing possible implementations of the first aspect, in a fourteenth possible implementation of the first aspect, when the second device is the access network node, the obtaining, by a first device, at least one key includes: sending, by the first device, a third request to an authentication node through the access network node, obtaining, by the first device, base keys based on the third request, where the base keys are generated after the first device and the authentication node authenticate each other; and deriving, by the first device, the at least one key based on the base keys.

With reference to the fourteenth possible implementation of the first aspect, in a fifteenth possible implementation of the first aspect, the deriving, by the first device, the at least one key based on the base keys includes: deriving, by the first device, an intermediate key based on the base keys; and deriving, by the first device, the at least one key based on the intermediate key.

With reference to the fifteenth possible implementation of the first aspect, in a sixteenth possible implementation of the first aspect, the deriving, by the first device, an intermediate key based on the base keys is deriving, by the first device, the intermediate key based on a first parameter and the base keys, where the first parameter includes at least one of an identifier of the access network node, a non-access stratum (NAS) counter, a sequence number for generating the intermediate key, a sequence number of a packet, a nonce 1, the bearer identifier, the flow identifier, or the slice identifier.

With reference to the fifteenth possible implementation of the first aspect, in a seventeenth possible implementation of the first aspect, the deriving, by the first device, the at least one key based on the intermediate key is deriving, by the first device, the at least one key based on the second parameter and the intermediate key, where the second parameter includes at least one of an air interface security policy identifier, a security algorithm identifier, an NAS counter, a nonce 2, an air interface resource identifier, an air interface bearer identifier, the slice identifier, or the session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

With reference to the fourteenth possible implementation of the first aspect, in an eighteenth possible implementation of the first aspect, the at least one key includes at least one of an air interface signaling encryption key, an air interface signaling integrity encryption key, a user plane key, or a user plane integrity encryption key.

With reference to any one of the foregoing possible implementations of the first aspect, in a nineteenth possible implementation of the first aspect, the protected data is header data, payload data, or a packet, where the packet includes the header data and the payload data.

According to a second aspect, a security implementation method is provided and includes: determining, by a second device, a session identifier of a session; obtaining, by the second device, a security policy of the session and at least one key; identifying, by the second device based on the session identifier, protected data that is of the session and is sent by a first device; and restoring the protected data using the at least one key based on the security policy of the session to obtain session data, where the protected data is obtained by the first device by protecting security of the session data using the at least one key based on the security policy of the session, and where the first device is configured to encrypt the session data using the at least one key based on the security policy to obtain the protected data. When the first device is a terminal device, the second device is an access network node or a user plane node. Alternatively, when the first device is an access network node or a user plane node, the second device is a terminal device.

With reference to the second aspect, in a first possible implementation of the second aspect, the at least one key includes a first key and a second key, where the first key is used to protect first security of the session, and where the second key is used to protect second security of the session.

With reference to the first possible implementation of the second aspect, in a second possible implementation of the second aspect, the security policy is used to indicate a protection mode of the session data, and the protection mode is protecting the first security of the session data using the first key based on a first security algorithm, or protecting the second security of the session data using the second key based on a second security algorithm, or protecting the first security of the session data using the first key based on the first security algorithm and protecting the second security of the session data using the second key based on the second security algorithm.

With reference to the second possible implementation of the second aspect, in a third possible implementation of the second aspect, the security policy is further used to indicate at least one of the first security algorithm, the second security algorithm, a key length, or a key update time.

With reference to the third possible implementation of the second aspect, in a fourth possible implementation of the second aspect, the key length includes a first key length and/or a second key length, where the first key length is used to represent a length of the first key, and where the second key length is used to represent a length of the second key.

With reference to the third possible implementation of the second aspect, in a fifth possible implementation of the second aspect, the key update time includes a first key update time and/or a second key update time, where the first key update time is used to represent an update time of the first key, and where the second key update time is used to represent an update time of the second key.

With reference to any one of the foregoing possible implementations of the second aspect, in a sixth possible implementation of the second aspect, when the second device is the user plane node, the determining, by a second device, a session identifier of a session is determining, by the second device, the session identifier of the session based on an encapsulation header in which the protected data is located, or determining, by the second device, the session identifier of the session based on a tunnel identifier in an encapsulation header in which the protected data is located, or determining, by the second device, the session identifier of the session based on an outer Internet Protocol (IP) packet header in which the protected data is located, or determining, by the second device, the session identifier of the session based on an encapsulation header in which the protected data is located and an outer IP packet header in which the protected data is located, or determining, by the second device, the session identifier of the session based on a protocol data unit header in which the protected data is located and an encapsulation header in which the protected data is located, or determining, by the second device, the session identifier of the session based on a parameter field in the protected data.

With reference to any one of the foregoing possible implementations of the second aspect, in a seventh possible implementation of the second aspect, when the second device is the access network node, the determining, by a second device, a session identifier of a session is determining, by the second device, the session identifier of the session based on an air interface resource occupied by the session, or determining, by the second device, the session identifier of the session based on an air interface identifier of an air interface occupied by the session, or determining, by the second device, the session identifier of the session based on an identifier of a data radio bearer occupied by the session, or determining, by the second device, the session identifier of the session based on a parameter field in the protected data.

With reference to the sixth or the seventh possible implementation of the second aspect, in an eighth possible implementation of the second aspect, the first security is confidentiality, and the second security is integrity.

With reference to the eighth possible implementation of the second aspect, in a ninth possible implementation of the second aspect, the parameter field includes at least one of a first identifier field, a second identifier field, or a third identifier field, where the first identifier field is used to indicate that a current message is a session message, where the second identifier field is used to indicate at least one of a service identifier, the session identifier, or a slice identifier, and where the third identifier is used to indicate the protection mode of the session.

With reference to the ninth possible implementation of the second aspect, in a tenth possible implementation of the second aspect, the parameter field further includes at least one of a length field, a packet field, or a MAC field, where the length field is used to indicate a length of the parameter field, where the packet field is used to indicate a length of a packet when the packet is encrypted, and where the MAC field is used to indicate that integrity of the session is protected.

With reference to any one of the foregoing possible implementations of the second aspect, in an eleventh possible implementation of the second aspect, when the second device is the access network node, the obtaining, by the second device, the security policy is obtaining, by the second device, the security policy from a first network element, where the first network element is any one of an authentication controller, a key management controller, a policy controller, or a key controller.

With reference to the eleventh possible implementation of the second aspect, in a twelfth possible implementation of the second aspect, when the first network element is the policy controller, obtaining, by the second device, the security policy from the policy controller includes: receiving, by the second device, a first request sent by the first device, where the first request includes a security capability of the first device and a service security requirement; sending, by the second device, a second request to the policy controller, where the second request is generated based on the first request and includes the security capability of the first device, the service security requirement, and a security requirement of the access network node; and receiving, by the second device, the security policy returned by the policy controller, where the security policy is generated by the policy controller based on the second request.

With reference to the eleventh possible implementation of the second aspect, in a thirteenth possible implementation of the second aspect, when the first network element is the policy controller, obtaining, by the second device, the security policy from the policy controller includes: receiving, by the second device, a first request sent by the first device, where the first request includes a security capability of the first device and a service security requirement; sending, by the second device, a second request to the policy controller through at least one network element, where the second request is generated based on the first request and includes the security capability of the first device, the service security requirement, and a security requirement of the access network node; and receiving, by the second device, the security policy returned by the policy controller through the at least one network element, where the security policy is generated by the policy controller based on the second request.

With reference to the thirteenth possible implementation of the second aspect, in a fourteenth possible implementation of the second aspect, the at least one network element includes a session management network element. Alternatively, the at least one network element includes a session management network element or a mobility management entity.

With reference to the eleventh possible implementation of the second aspect, in a fifteenth possible implementation of the second aspect, obtaining, by the second device, the security policy from the policy controller includes: receiving, by the second device, a first request sent by the first device, where the first request includes a security capability of the first device and a service security requirement; forwarding, by the second device, the first request to the policy controller; receiving, by the second device, a core network security policy returned by the policy controller;

and generating the security policy based on the core network security policy and a security capability of the access network node.

With reference to any one of the eighth to the fifteenth possible implementations of the second aspect, in a sixteenth possible implementation of the second aspect, when the second device is the access network node, the obtaining, by the second device, at least one key includes: sending, by the second device, a third request to a key management center; receiving, by the second device, an intermediate key returned by the key management center based on the third request, where the intermediate key is derived based on base keys, and the base keys are sent by an authentication node to the key management center; and deriving, by the second device, the at least one key based on the intermediate key.

With reference to the sixteenth possible implementation of the second aspect, in a seventeenth possible implementation of the second aspect, the intermediate key is derived based on a first parameter, where the first parameter includes at least one of an identifier of the access network node, an NAS counter, a sequence number for generating the intermediate key, a sequence number of a packet, a nonce 1, a bearer identifier, a flow identifier, or the slice identifier.

With reference to the seventeenth possible implementation of the second aspect, in an eighteenth possible implementation of the second aspect, the deriving, by the second device, the at least one key based on the intermediate key is: deriving, by the second device, the at least one key based on the second parameter and the intermediate key, where the second parameter includes at least one of an air interface security policy identifier, a security algorithm identifier, an NAS counter, a nonce 2, an air interface resource identifier, an air interface bearer identifier, the slice identifier, or the session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

With reference to the sixteenth possible implementation of the second aspect, in a nineteenth possible implementation of the second aspect, the at least one key includes at least one of an air interface signaling encryption key, an air interface signaling integrity encryption key, a user plane key, or a user plane integrity encryption key.

With reference to any one of the foregoing possible implementations of the second aspect, in a twentieth possible implementation of the second aspect, when the second device is the user plane node, the obtaining, by the second device, at least one key is requesting, by the second device, the at least one key from the first network element, where the first network element is any one of the authentication controller, the key management controller, the policy controller, or the key controller.

With reference to any one of the foregoing possible implementations of the second aspect, in a twenty-first possible implementation of the second aspect, the protected data is header data, payload data, or a packet, where the packet includes the header data and the payload data.

According to a third aspect, a security policy generation method is provided and includes: receiving, by a policy controller, a policy request sent by a target network element, where the policy request includes at least one of a security capability of a terminal device, a service security requirement of the terminal device, or a security requirement of an access network node; generating, by the policy controller, a security policy based on a target parameter, where the target parameter is generated based on the first request and includes at least one of the security capability of the terminal device, the service security requirement, or the security requirement of the access network node; and sending, by the policy controller, the security policy to the access network node.

With reference to the third aspect, in a first possible implementation of the third aspect, the target parameter further includes a preset security capability of the terminal device, where the preset security capability of the terminal device is obtained from an authentication service controller or an authentication server function (AUSF).

With reference to any one of the foregoing possible implementations of the third aspect, in a second possible implementation of the third aspect, the target parameter further includes a security requirement of a server, where the security requirement of the server is obtained from the server.

With reference to any one of the foregoing possible implementations of the third aspect, in a third possible implementation of the third aspect, the target network element is the access network node or a session management network element.

According to a fourth aspect, a key generation method is provided and includes:
  sending, by the first device, a third request to an authentication node through the access network node; obtaining, by the first device, base keys based on the third request, where the base keys are generated after the first device and the authentication node authenticate each other; and deriving, by the first device, the at least one key based on the base keys.

With reference to the fourth aspect, in a first possible implementation of the fourth aspect, the deriving, by the terminal device, the at least one key based on the base keys includes: deriving, by the terminal device, an intermediate key based on the base keys; and deriving, by the terminal device, the at least one key based on the intermediate key.

With reference to the first possible implementation of the fourth aspect, in a second possible implementation of the fourth aspect, the deriving, by the first device, an intermediate key based on the base keys is deriving, by the terminal device, the intermediate key based on a first parameter and the base keys, where the first parameter includes at least one of an identifier of the access network node, an NAS counter, a sequence number for generating the intermediate key, a sequence number of a packet, a nonce 1, a bearer identifier, a flow identifier, or a slice identifier.

With reference to the first possible implementation of the fourth aspect, in a third possible implementation of the fourth aspect, the deriving, by the terminal device, the at least one key based on the intermediate key is deriving, by the terminal device, the at least one key based on the second parameter and the intermediate key, where the second parameter includes at least one of an air interface security policy identifier, a security algorithm identifier, an NAS counter, a nonce 2, an air interface resource identifier, an air interface bearer identifier, a slice identifier, or a session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

With reference to any one of the foregoing possible implementations of the fourth aspect, in a fourth possible implementation of the fourth aspect, the at least one key includes at least one of an air interface signaling encryption key, an air interface signaling integrity encryption key, a user plane key, or a user plane integrity encryption key.

According to a fifth aspect, a first device is provided and includes an obtaining module and a sending module, where the obtaining module is configured to obtain a security policy of a session and at least one key, where the sending module is configured to send protected data to a second device, and where the protected data is obtained by protecting security of session data of the session using the at least one key based on the security policy of the session. The second device is configured to restore the protected data using the at least one key based on the security policy to obtain the session data. When the first device is a terminal device, the second device is an access network node or a user plane node. When the first device is an access network node or a user plane node, the second device is a terminal device.

With reference to the fifth aspect, in a first possible implementation of the fifth aspect, the at least one key includes a first key and a second key, where the first key is used to protect first security of the session, and where the second key is used to protect second security of the session.

With reference to the first possible implementation of the fifth aspect, in a second possible implementation of the fifth aspect, the security policy is used to indicate a protection mode of the session data, and the protection mode is protecting the first security of the session data using the first key based on a first security algorithm, or protecting the second security of the session data using the second key based on a second security algorithm, or protecting the first security of the session data using the first key based on the first security algorithm and protecting the second security of the session data using the second key based on the second security algorithm.

With reference to the second possible implementation of the fifth aspect, in a third possible implementation of the fifth aspect, the security policy is further used to indicate at least one of the first security algorithm, the second security algorithm, a key length, or a key update time.

With reference to the third possible implementation of the fifth aspect, in a fourth possible implementation of the fifth aspect, the key length includes a first key length and/or a second key length, where the first key length is used to represent a length of the first key, and where the second key length is used to represent a length of the second key.

With reference to the third possible implementation of the fifth aspect, in a fifth possible implementation of the fifth aspect, the key update time includes a first key update time and/or a second key update time, where the first key update time is used to represent an update time of the first key, and where the second key update time is used to represent an update time of the second key.

With reference to any one of the foregoing possible implementations of the fifth aspect, in a sixth possible implementation of the fifth aspect, the first security is confidentiality, and the second security is integrity.

With reference to the sixth possible implementation of the fifth aspect, in a seventh possible implementation of the fifth aspect, the protected data further includes a parameter field, and the parameter field includes at least one of a first identifier field, a second identifier field, or a third identifier field, where the first identifier field is used to indicate that a current message is a session message, where the second identifier field is used to indicate at least one of a service identifier, a session identifier, a bearer identifier, a flow identifier, or a slice identifier, and where the third identifier is used to indicate the protection mode of the session.

With reference to the seventh possible implementation of the fifth aspect, in an eighth possible implementation of the fifth aspect, the parameter field further includes at least one of a length field, a packet field, or a MAC field, where the length field is used to indicate a length of the parameter field, where the packet field is used to indicate a length of a packet when the packet is encrypted, and where the MAC field is used to indicate that integrity of the session is protected.

With reference to any one of the foregoing possible implementations of the fifth aspect, in a ninth possible implementation of the fifth aspect, the obtaining module is configured to obtain the security policy from a policy controller.

With reference to the ninth possible implementation of the fifth aspect, in a tenth possible implementation of the fifth aspect, the obtaining module includes a sending unit and a receiving unit, where the sending unit is configured to send a first request to the access network node, where the first request includes a security capability of the first device and a service security requirement, and where the receiving unit is configured to receive the security policy returned by the access network node. The security policy is obtained by the access network node by sending a second request to the policy controller, and the second request is generated by the access network node based on the first request and includes the security capability of the first device, the service security requirement, and a security requirement of the access network node.

With reference to the ninth possible implementation of the fifth aspect, in an eleventh possible implementation of the fifth aspect, the obtaining module includes a sending unit and a receiving unit, where the sending unit is configured to send a first request to the access network node, where the first request includes a security capability of the first device and a service security requirement, and where the receiving unit is configured to receive the security policy returned by the access network node. The security policy is obtained by the access network node by forwarding a second request to the policy controller through at least one network element, and the second request is generated by the access network node based on the first request and includes the security capability of the first device, the service security requirement, and a security requirement of the access network node.

With reference to the eleventh possible implementation of the fifth aspect, in a twelfth possible implementation of the fifth aspect, the at least one network element includes a session management network element. Alternatively, the at least one network element includes a session management network element or a mobility management entity.

With reference to the ninth possible implementation of the fifth aspect, in a thirteenth possible implementation of the fifth aspect, the obtaining module includes a sending unit and a receiving unit, where the sending unit is configured to send a first request to the access network node, where the first request includes a security capability of the first device and a service security requirement, and where the receiving unit is configured to receive the security policy returned by the access network node, The security policy is generated by the access network node based on a core network security policy and a security capability of the access network node, and the core network security policy is generated by the policy controller based on the first request forwarded by the access network node.

With reference to any one of the foregoing possible implementations of the fifth aspect, in a fourteenth possible implementation of the fifth aspect, when the second device is the access network node, the obtaining module includes a sending unit, an obtaining unit, and a deriving unit, where the sending unit is configured to send a third request to an authentication node through the access network node, where the obtaining unit is configured to obtain base keys based on the third request, where the base keys are generated after the first device and the authentication node authenticate each other, and where the deriving unit is configured to derive the at least one key based on the base keys.

With reference to the fourteenth possible implementation of the fifth aspect, in a fifteenth possible implementation of the fifth aspect, the deriving unit is configured to derive an intermediate key based on the base keys, and derive the at least one key based on the intermediate key.

With reference to the fifteenth possible implementation of the fifth aspect, in a sixteenth possible implementation of the fifth aspect, the deriving unit is configured to derive the intermediate key based on a first parameter and the base keys, where the first parameter includes at least one of an identifier of the access network node, an NAS counter, a sequence number for generating the intermediate key, a sequence number of a packet, a nonce 1, the bearer identifier, the flow identifier, or the slice identifier.

With reference to the fifteenth possible implementation of the fifth aspect, in a seventeenth possible implementation of the fifth aspect, the deriving unit is configured to derive the at least one key based on the second parameter and the intermediate key, where the second parameter includes at least one of an air interface security policy identifier, a security algorithm identifier, an NAS counter, a nonce 2, an air interface resource identifier, an air interface bearer identifier, the slice identifier, or the session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

With reference to the fourteenth possible implementation of the fifth aspect, in an eighteenth possible implementation of the fifth aspect, the at least one key includes at least one of an air interface signaling encryption key, an air interface signaling integrity encryption key, a user plane key, or a user plane integrity encryption key.

With reference to any one of the foregoing possible implementations of the fifth aspect, in a nineteenth possible implementation of the fifth aspect, the protected data is header data, payload data, or a packet, where the packet includes the header data and the payload data.

According to a sixth aspect, a second device is provided and includes a determining module, an obtaining module, and an identification module, where the determining module is configured to determine a session identifier of a session, the obtaining module is configured to obtain a security policy of the session and at least one key, and where the identification module is configured: to identify, based on the session identifier, protected data that is of the session and is sent by a first device; and restore the protected data using the at least one key based on the security policy of the session to obtain session data. The protected data is obtained by the first device by protecting security of the session data using the at least one key based on the security policy of the session, and the first device is configured to encrypt the session data using the at least one key based on the security policy to obtain the protected data. When the first device is a terminal device, the second device is an access network node or a user plane node. When the first device is an access network node or a user plane node, the second device is a terminal device.

With reference to the sixth aspect, in a first possible implementation of the sixth aspect, the at least one key includes a first key and a second key, where the first key is used to protect first security of the session, and where the second key is used to protect second security of the session.

With reference to the first possible implementation of the sixth aspect, in a second possible implementation of the sixth aspect, the security policy is used to indicate a protection mode of the session data, and the protection mode is protecting the first security of the session data using the first key based on a first security algorithm, or protecting the second security of the session data using the second key based on a second security algorithm, or protecting the first security of the session data using the first key based on the first security algorithm and protecting the second security of the session data using the second key based on the second security algorithm.

With reference to the second possible implementation of the sixth aspect, in a third possible implementation of the sixth aspect, the security policy is further used to indicate at least one of the first security algorithm, the second security algorithm, a key length, or a key update time.

With reference to the third possible implementation of the sixth aspect, in a fourth possible implementation of the sixth aspect, the key length includes a first key length and/or a second key length, where the first key length is used to represent a length of the first key, and where the second key length is used to represent a length of the second key.

With reference to the third possible implementation of the sixth aspect, in a fifth possible implementation of the sixth aspect, the key update time includes a first key update time and/or a second key update time, where the first key update time is used to represent an update time of the first key, and where the second key update time is used to represent an update time of the second key.

With reference to any one of the foregoing possible implementations of the sixth aspect, in a sixth possible implementation of the sixth aspect, when the second device is the user plane node, the determining module is configured to: determine the session identifier of the session based on an encapsulation header in which the protected data is located; or determine the session identifier of the session based on a tunnel identifier in an encapsulation header in which the protected data is located; or determine the session identifier of the session based on an outer IP packet header in which the protected data is located; or determine the session identifier of the session based on an encapsulation header in which the protected data is located and an outer IP packet header in which the protected data is located; or determine the session identifier of the session based on a protocol data unit header in which the protected data is located and an encapsulation header in which the protected data is located; or determine the session identifier of the session based on a parameter field in the protected data.

With reference to any one of the foregoing possible implementations of the sixth aspect, in a seventh possible implementation of the sixth aspect, when the second device is the access network node, the determining module is configured to: determine the session identifier of the session based on an air interface resource occupied by the session; or determine the session identifier of the session based on an air interface identifier of an air interface occupied by the session; or determine the session identifier of the session based on an identifier of a data radio bearer occupied by the session; or determine the session identifier of the session based on a parameter field in the protected data.

With reference to the sixth or the seventh possible implementation of the sixth aspect, in an eighth possible implementation of the sixth aspect, the first security is confidentiality, and the second security is integrity.

With reference to the eighth possible implementation of the sixth aspect, in a ninth possible implementation of the sixth aspect, the parameter field includes at least one of a first identifier field, a second identifier field, and a third identifier field, where the first identifier field is used to indicate that a current message is a session message, where the second identifier field is used to indicate at least one of a service identifier, the session identifier, or a slice identifier, and where the third identifier is used to indicate the protection mode of the session.

With reference to the ninth possible implementation of the sixth aspect, in a tenth possible implementation of the sixth aspect, the parameter field further includes at least one of a length field, a packet field, or a MAC field, where the length field is used to indicate a length of the parameter field, where the packet field is used to indicate a length of a packet when the packet is encrypted, and where the MAC field is used to indicate that integrity of the session is protected.

With reference to any one of the foregoing possible implementations of the sixth aspect, in an eleventh possible implementation of the sixth aspect, when the second device is the access network node, the obtaining module is configured to obtain the security policy from a first network element, where the first network element is any one of an authentication controller, a key management controller, a policy controller, or a key controller.

With reference to the eleventh possible implementation of the sixth aspect, in a twelfth possible implementation of the sixth aspect, when the first network element is the policy controller, the obtaining module includes a receiving unit and a sending unit, where the receiving unit is configured to receive a first request sent by the first device, where the first request includes a security capability of the first device and a service security requirement, and where the sending unit is configured to send a second request to the policy controller. The second request is generated based on the first request and includes the security capability of the first device, the service security requirement, and a security requirement of the access network node. Additionally, the receiving unit is configured to receive the security policy returned by the policy controller, where the security policy is generated by the policy controller based on the second request.

With reference to the eleventh possible implementation of the sixth aspect, in a thirteenth possible implementation of the sixth aspect, when the first network element is the policy controller, the obtaining module includes a receiving unit and a sending unit, where the receiving unit is configured to receive a first request sent by the first device, where the first request includes a security capability of the first device and a service security requirement, and where the sending unit is configured to send a second request to the policy controller through at least one network element. The second request is generated based on the first request and includes the security capability of the first device, the service security requirement, and a security requirement of the access network node. Additionally, the receiving unit is configured to receive the security policy returned by the policy controller through the at least one network element, where the security policy is generated by the policy controller based on the second request.

With reference to the thirteenth possible implementation of the sixth aspect, in a fourteenth possible implementation of the sixth aspect, the at least one network element includes a session management network element. Alternatively, the at least one network element includes a session management network element or a mobility management entity.

With reference to the eleventh possible implementation of the sixth aspect, in a fifteenth possible implementation of the sixth aspect, the obtaining module includes a receiving unit and a sending unit, where the receiving unit is configured to receive a first request sent by the first device, where the first request includes a security capability of the first device and a service security requirement, and where the sending unit is configured to forward the first request to the policy controller. Additionally, the receiving unit is configured to receive a core network security policy returned by the policy controller, and generate the security policy based on the core network security policy and a security capability of the access network node.

With reference to any one of the eighth to the fifteenth possible implementations of the sixth aspect, in a sixteenth possible implementation of the sixth aspect, when the second device is the access network node, the obtaining module includes a sending unit, a receiving unit, and a deriving unit, where the sending unit is configured to send a third request to a key management center, where the receiving unit is configured to receive an intermediate key returned by the key management center based on the third request, where the intermediate key is derived based on base keys, where the base keys are sent by an authentication node to the key management center, and where the deriving unit is configured to derive the at least one key based on the intermediate key.

With reference to the sixteenth possible implementation of the sixth aspect, in a seventeenth possible implementation of the sixth aspect, the intermediate key is derived based on a first parameter, where the first parameter includes at least one of an identifier of the access network node, an NAS counter, a sequence number for generating the intermediate key, a sequence number of a packet, a nonce 1, a bearer identifier, a flow identifier, or the slice identifier.

With reference to the seventeenth possible implementation of the sixth aspect, in an eighteenth possible implementation of the sixth aspect, the deriving unit is configured to derive the at least one key based on the second parameter and the intermediate key, where the second parameter includes at least one of an air interface security policy identifier, a security algorithm identifier, an NAS counter, a nonce 2, an air interface resource identifier, an air interface bearer identifier, the slice identifier, or the session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

With reference to the sixteenth possible implementation of the sixth aspect, in a nineteenth possible implementation of the sixth aspect, the at least one key includes at least one of an air interface signaling encryption key, an air interface signaling integrity encryption key, a user plane key, or a user plane integrity encryption key.

With reference to any one of the foregoing possible implementations of the sixth aspect, in a twentieth possible implementation of the sixth aspect, when the second device is the user plane node, the obtaining module is configured to request the at least one key from the first network element, where the first network element is any one of the authentication controller, the key management controller, the policy controller, or the key controller.

With reference to any one of the foregoing possible implementations of the sixth aspect, in a twenty-first possible implementation of the sixth aspect, the protected data is header data, payload data, or a packet, where the packet includes the header data and the payload data.

According to a seventh aspect, a policy controller is provided and includes a receiving module, a generation module, and a sending module, where the receiving module is configured to receive a policy request sent by a target network element, where the policy request includes at least one of a security capability or a service security requirement of a terminal device and a security requirement of an access network node, where the generation module is configured to generate a security policy based on a target parameter, where the target parameter is generated based on the first request and includes at least one of the security capability of the terminal device, the service security requirement, or the security requirement of the access network node, and where the sending module is configured to send the security policy to the access network node.

With reference to the seventh aspect, in a first possible implementation of the seventh aspect, the target parameter further includes a preset security capability of the terminal device, where the preset security capability of the terminal device is obtained from an authentication service controller or AUSF.

With reference to any one of the foregoing possible implementations of the seventh aspect, in a second possible implementation of the seventh aspect, the target parameter further includes a security requirement of a server, where the security requirement of the server is obtained from the server.

With reference to any one of the foregoing possible implementations of the seventh aspect, in a third possible implementation of the seventh aspect, the target network element is the access network node or a session management network element.

According to an eighth aspect, a first device is provided and includes a sending module, an obtaining module, and a deriving module, where the sending module is configured to send a third request to an authentication node through the access network node, where the obtaining module is configured to obtain base keys based on the third request, where the base keys are generated after the first device and the authentication node authenticate each other, and where the deriving module is configured to derive the at least one key based on the base keys.

With reference to the eighth aspect, in a first possible implementation of the eighth aspect, the deriving module is configured to derive an intermediate key based on the base keys, and derive the at least one key based on the intermediate key.

With reference to the first possible implementation of the eighth aspect, in a second possible implementation of the eighth aspect, the deriving module is configured to derive the intermediate key based on a first parameter and the base keys, where the first parameter includes at least one of an identifier of the access network node, an NAS counter, a sequence number for generating the intermediate key, a sequence number of a packet, a nonce 1, a bearer identifier, a flow identifier, or a slice identifier.

With reference to the first possible implementation of the eighth aspect, in a third possible implementation of the eighth aspect, the deriving module is configured to derive the at least one key based on the second parameter and the intermediate key, where the second parameter includes at least one of an air interface security policy identifier, a security algorithm identifier, an NAS counter, a nonce 2, an air interface resource identifier, an air interface bearer identifier, a slice identifier, or a session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

With reference to any one of the foregoing possible implementations of the eighth aspect, in a fourth possible implementation of the eighth aspect, the at least one key includes at least one of an air interface signaling encryption key, an air interface signaling integrity encryption key, a user plane key, or a user plane integrity encryption key.

According to a ninth aspect, a first device is provided and includes a memory and a processor, a transmitter, and a receiver that are coupled to the memory, where the transmitter is configured to send data to the outside, where the receiver is configured to receive data sent by the outside, the memory is configured to store code for implementing the method described in the first aspect, and where the processor is configured to execute program code stored in the memory to perform the method described in the first aspect.

According to a tenth aspect, a second device is provided and includes a memory and a processor, a transmitter, and a receiver that are coupled to the memory, where the transmitter is configured to send data to the outside, where the receiver is configured to receive data sent by the outside, where the memory is configured to store code for implementing the method described in the second aspect, and where the processor is configured to execute program code stored in the memory to perform the method described in the second aspect. According to a thirteenth aspect, a policy controller is provided and includes a memory and a processor, a transmitter, and a receiver that are coupled to the memory, where the transmitter is configured to send data to the outside, where the receiver is configured to receive data sent by the outside, where the memory is configured to store code for implementing the method described in the third aspect, and where the processor is configured to execute program code stored in the memory to perform the method described in the third aspect. According to a fourteenth aspect, a first device is provided and includes a memory and a processor, a transmitter, and a receiver that are coupled to the memory, where the transmitter is configured to send data to the outside, where the receiver is configured to receive data sent by the outside, where the memory is configured to store code for implementing the method described in the fourth aspect, and where the processor is configured to execute program code stored in the memory to perform the method described in the fourth aspect.

According to a fifteenth aspect, a storage medium is provided and configured to store code for implementing the method in the first aspect.

According to a sixteenth aspect, a storage medium is provided and configured to store code for implementing the method in the second aspect.

According to a seventeenth aspect, a storage medium is provided and configured to store code for implementing the method in the third aspect.

According to an eighteenth aspect, a storage medium is provided and configured to store code for implementing the method in the fourth aspect.

According to a nineteenth aspect, a communications system is provided, where the communications system includes a first device and a second device, where the first device is connected to the second device, where the first device is the device according to any one of the fifth aspect, and where the second device is the device according to any one of the sixth aspect.

In implementations of the embodiments of the present disclosure, the first device performs security protection on the session data using the security policy and the at least one key to obtain the protected data, and the second device restores the protected data based on the same security policy and at least one key to obtain the session data. In the embodiments of the present disclosure, end-to-end protection is implemented. After the session data is sent out from the first device (one end) and before the session data reaches the second device (the other end), the session data is always in a state of security protection. This prevents the session data from being illegally thieved during transmission. In addition, in the process of transmitting the session data, encryption and restoration do not need to be performed on an intermediate node that the session data passes through, and therefore resources can be saved effectively.

DESCRIPTION OF DRAWINGS

To describe the technical solutions in the embodiments of the present disclosure or in the background more clearly, the following briefly describes the accompanying drawings required for describing the embodiments of the present disclosure or the background.

FIG. 8 is a schematic diagram of an encapsulation header according to an embodiment of the present disclosure.

DESCRIPTION OF EMBODIMENTS

Figure 1:
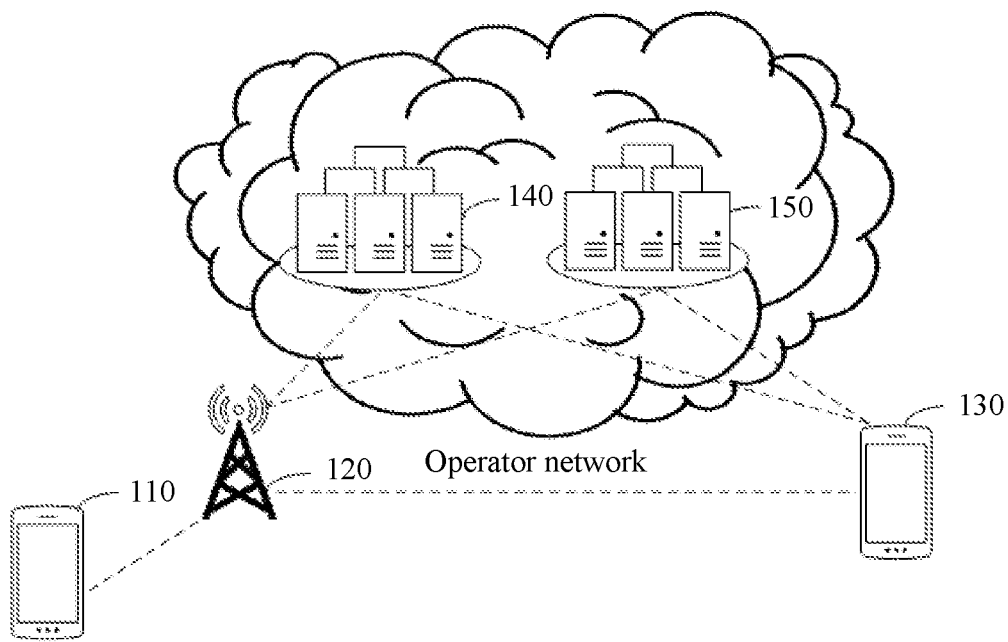
FIG. 1 is a schematic diagram of a network architecture according to an embodiment of the present disclosure.

For ease of understanding the solutions, the following first describes, using an example with reference to an accompanying drawing, a network architecture to which the solutions of embodiments of this application may be applied. As shown in FIG. 1, a future mobile communications network architecture includes a terminal device 110, an access network node 120, and a user plane node 130. The terminal device 110 accesses an operator network using the access network node 120, to implement communication with the user plane node 130.

The terminal device 110 is a logical entity, and may be any one of a user equipment (UE), a communications device, or an Internet of things (IoT) device. The user equipment may be a smartphone, a smartwatch, a smart tablet, or the like. The communications device may be a server, a gateway, a base station, a controller, or the like. The Internet of Things device may be a sensor, an electricity meter, a water meter, or the like.

The access network node 120 may be a wireless access point, for example, a base station, a Wi-Fi access point, or a BLUETOOTH access point, or may be a wired access point, for example, a gateway, a modem, a fiber to the x, or IP access.

The user plane node 130 may be a gateway, a server, a controller, a user plane function network element, or a terminal device. The user plane node 130 may be disposed in the operator network or may be disposed outside the operator network. It should be understood that, the user plane node 130 disposed outside the operator network in FIG. 1 is merely an example, and should not constitute a specific limitation. In addition, in an actual application, the user plane node 130 may be a terminal device, or may be a control network element such as a gateway, a server, a controller, or a user plane function network element. It should be understood that, the user plane node 130 represented by a terminal device in FIG. 1 is merely an example, and should not constitute a specific limitation.

The operator network includes a policy controller 140 a key management center (KMS) 150, and the like.

The policy controller 140 is configured to manage a security policy in the network. The PCF may be deployed as an independent logical function entity, or may be integrated in a device such as a mobility management (MM) network element, a session management (SM) network element, an AUSF, a policy and charging rules function (PCRF), a mobility management entity (MME), a home subscriber server (HSS), an authentication center (AuC), an authentication credential repository and processing function (ARPF) network element, a security context management network element (SCMF), an access and mobility management function (AMF) network element, an access node (AN), or a user plane node (UPF).

The KMS 150 is responsible for key generation, management, and agreement. The KMS may be deployed as an independent logical function entity, or may be integrated in a device such as an MM network element, an SM network element, an AUSF, a security anchor function (SEAF) network element, an MME, a HSS, an AuC, an ARPF network element, an SCMF, an AMF network element, an AN, a UPF, or an authentication unit (CP-AU).

Subsequently, a physical entity implementing a function of the key management center may be referred to as a key management device.

The mobility management network element is configured to manage location information, security, and service continuity of the terminal device. Subsequently, a physical entity implementing a function of the mobility management network element may be directly referred to as a mobility management device or MM.

The session management network element is configured to establish and manage a session, a slice, a flow, or a bearer. Subsequently, a physical entity implementing a function of the session management network element may be referred to as a session management device or SM. The mobility management network element is responsible for establishing and managing the slice, the flow, or the bearer.

The authentication service controller is responsible for key generation, management, and agreement. The AUSF may be deployed as an independent logical function entity, or may be integrated in a device such as an MM network element, or an SM network element.

The mobility management entity is used for access control, including security and permission control, mobility management, attachment and detachment, and session management functions, and when a user has a data service request, selecting a data gateway or a serving gateway to forward data of the user, and the like.

The home subscriber server is configured to manage and invoke a user database. The user database includes a user identity and a user configuration file, where the user configuration file includes root key information of the user, and may further include content such as a preset security capability and a parameter of the user. The HSS is mainly responsible for managing subscription data of the user and location information of a mobile user.

The authentication center is configured to store an authentication algorithm and a key, ensure security of various confidentiality parameters, and provide an authentication parameter to a home user register (HLR), e.g., HSS, ARPF, MME, or AUSF.

The authentication credential repository and processing function network element is configured to perform key management and generation, and authentication processing.

The security context management network element is configured to perform security context management, including key management, generation, and distribution.

The AMF network element is responsible for access control and mobility management.

It should be noted that, logical relationships between various network elements are reflected in FIG. 1. However, some network elements may be deployed independently, or every two or more network elements are integrated in one entity for deployment. For example, the SM and the MM are deployed in one entity, or the SM and the MM are deployed in different entities respectively, or the AMF and the SEAF are deployed together.

Figure 2:
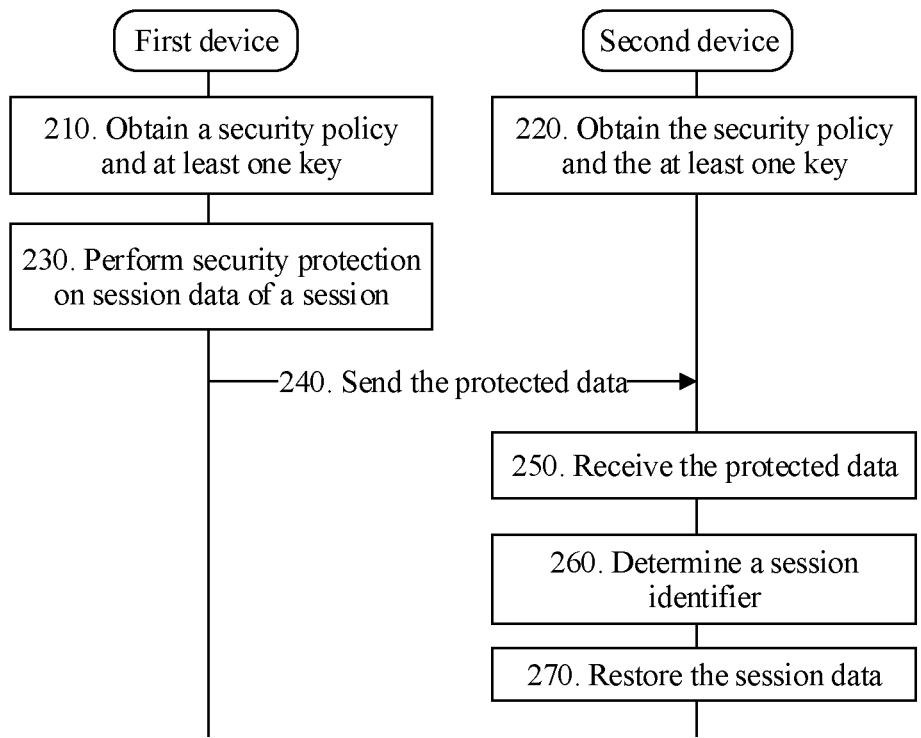
FIG. 2 is a schematic flowchart of a security implementation method according to an embodiment of the present disclosure.

Based on the architecture in FIG. 1, to implement end (first device) to end (second device) security protection, an embodiment of the present disclosure provides a security implementation method. When the first device is a terminal device, the second device is an access network node or a user plane node. Alternatively, when the first device is an access network node or a user plane node, the second device is a terminal device. As shown in FIG. 2, the security implementation method provided by this embodiment of the present disclosure includes the following steps.

210. A first device obtains a security policy of a session and at least one key.

220. A second device obtains the security policy of the session and the at least one key.

In this embodiment of the present disclosure, the session has a unique session identifier, that is, the session identifier is used to identify an identity of the session. The session identifier may be generated by any one of a terminal device, an access network node, a mobility management network element, a session management network element, or a policy controller. When the session identifier is generated by the terminal device, the session identifier is generated when the terminal device prepares to establish the session. When the session identifier is generated by any one of the access network node, the mobility management network element, the session management network element, or the policy controller, the session identifier is generated when any one of the access network node, the mobility management network element, the session management network element, or the policy controller receives a request sent by another network element. The session identifier may be a new identifier, or may be another identifier that is reused, for example, any one of an air interface identifier, a radio bearer identifier, a slice identifier, an air interface resource identifier, a permanent device identity, a temporary device identity, a permanent user identity, or a temporary user identity.

In this embodiment of the present disclosure, the security policy is used to indicate a protection mode of the session, for example, indicate which type or which types of security of the session need to be protected. In addition to indicating which type or which types of security of the session need to be protected, the security policy of the session may further indicate at least one of a security algorithm used by each type of security protection, a used key length, or a key update time.

In this embodiment of the present disclosure, the security of the session includes confidentiality, integrity, non-repudiation, and the like. The confidentiality of the session indicates that the session becomes an unreadable ciphertext after the session is processed using an algorithm, to achieve an objective of preventing session data from being illegally thieved and read. The integrity of the session indicates that the session data is not illegally added, deleted, replaced, or the like in a transmission process. The non-repudiation of the session indicates that two call parties in the session cannot repudiate content of the session and their actions of sending the session. Security protection of the session is implemented using the security algorithm and the at least one key for session processing.

In this embodiment of the present disclosure, the security algorithm may be any one of algorithms such as null, Advanced Encryption Standard (AES), SNOW THIRD GENERATION (3G), and ZUC, where null represents a null algorithm. The key length may be any one of lengths such as 64 bits, 96 bits, 128 bits, 192 bits, or 256 bits. The key update time may be any one of times such as 6 hours, 12 hours, 24 hours, or 48 hours. The security algorithm, the key length, and the key update time are used merely as an example for description, and should not constitute a limitation to this application.

It may be understood that, a plurality of security protections of the session may be implemented using a same security algorithm, a same key, and a same key update time for session processing, or may be implemented using different security algorithms, different keys, and different key update times for session processing. For example, in an embodiment, when the confidentiality and integrity of the session are protected, for the confidentiality, a used security algorithm is the SNOW 3G algorithm, a key length is 64 bits, and a key update time is 6 hours, and for the integrity, a used security algorithm is the SNOW 3G algorithm, a key length is 64 bits, and a key update time is 6 hours. In another embodiment, when the confidentiality and integrity of the session are protected, for the confidentiality, a used security algorithm is the SNOW 3G algorithm, a key length is 64 bits, and a key update time is 6 hours, and for the integrity, a used security algorithm is the ZUC algorithm, a key length is 128 bits, and a key update time is 12 hours.

In an embodiment, protection modes of the session include the following three modes: protecting first security of the session data using a first key based on a first security algorithm; protecting second security of the session data using a second key based on a second security algorithm; and protecting first security of the session data using a first key based on a first security algorithm and protecting second security of the session data using a second key based on a second security algorithm. The key length includes a first key length and/or a second key length. The first key length is used to represent a length of the first key, and the second key length is used to represent a length of the second key. The first key length and the second key length may be the same or may be different. The key update time includes a first key update time and/or a second key update time. The first key update time is used to represent an update time of the first key, and the second key update time is used to represent an update time of the second key. The first key update time and the second key update time may be the same or may be different. Herein the first security of the session is the confidentiality of the session, and the second security of the session is the integrity of the session. Correspondingly, the first security algorithm is any one of algorithms such as null, Triple Data Encryption Standard (3DES), AES, SNOW 3G BLOWFISH, SERPENT, ZUC, HC-256, and GRAIN. The second security algorithm is any one of algorithms such as null, AES, ZUC, SNOW 3G hash-based message authentication code (HMAC), one-key message authentication code (OMAC), cipher block chaining message authentication code (CBC-MAC), parallelizable message authentication code (PMAC), universal message authentication code (UMAC), and VMAC. The first security algorithm and the second security algorithm may be the same or may be different.

Based on the foregoing descriptions, it can be known that content of the security policy of the session may include but is not limited to at least one of an algorithm identifier, a key length, or a key update time.

A first algorithm identifier and a second algorithm identifier are respectively used to indicate the security algorithm used for the first security and the security algorithm used for the second security. Alternatively, when the security algorithm used for the first security and the security algorithm used for the second security are different, algorithm identifiers include a first algorithm identifier and a second algorithm identifier, where the first algorithm identifier is used to represent the security algorithm used for the first security, and where the second algorithm identifier is used to represent the security algorithm used for the second security algorithm. Alternatively, when the security algorithm used for the first security and the security algorithm used for the second security are the same, algorithm identifiers may include a first algorithm identifier and a second algorithm identifier, where the first algorithm identifier and the second algorithm identifier are the same. When only one algorithm identifier is used to indicate the security algorithm used for the first security and the security algorithm used for the second security, the security algorithm used for the first security and the security algorithm used for the second security are the same security algorithm.

The first key length and the second key length are respectively used to indicate the length of the key used for the first security and the length of the key used for the second security. When the length of the key used by the security algorithm for the first security and the length of the key used by the algorithm for the second security are different, the key lengths include the first key length and the second key length, where the first key length is used to indicate the length of the key used by the security algorithm for the first security, and where the second key length is used to indicate the length of the key used by the security algorithm for the second security. Alternatively, when the length of the key used by the security algorithm for the first security and the key used by the algorithm for the second security are the same, the key lengths may include the first key length and the second key length, where the first key length and the second key length are the same. When only one key length is used to indicate the length of the key used for the first security and the length of the key used for the second security, the length of the key used for the first security and the length of the key used for the second security are the same.

The first key update time and the second key update time are respectively used to indicate the update time of the key used by the security algorithm for the first security and the update time of the key used by the security algorithm for the second security. When the update time of the key used by the security algorithm for the first security and the update time of the key used by the algorithm for the second security are different, the key update time includes the first key update time and the second key update time, where the first key update time used to indicate the update time of the key used by the security algorithm for the first security, and where the second key update time is used to indicate the update time of the key used by the security algorithm for the second security. Alternatively, when the update time of the key used by the security algorithm for the first security and the update time of the key used by the algorithm for the second security are the same, the key update time may include the first key update time and the second key update time, where the first key update time and the second key update time are the same. When only one key update time is used to indicate the update time of the key used by the security algorithm for the first security and the update time of the key used by the security algorithm for the second security, the update time of the key used by the security algorithm for the first security and the update time of the key used by the security algorithm for the second security are the same.

Still further, in the content of the security policy of the session, a first bit and a second bit may be further set additionally, where the first bit is used to indicate whether the first security needs to be protected, and where the second bit is used to indicate whether the second security needs to be protected. For example, when the first bit is "0", it is used to indicate that the first security does not need to be protected; when the first bit is "1", it is used to indicate that the first security needs to be protected. When the second bit is "0", it is used to indicate that the second security does not need to be protected; when the second bit is "1", it is used to indicate that the second security needs to be protected.

A format of the security policy includes a plurality of forms. In an embodiment, the format of the security policy is as follows: Security policy=Bit 1||First security algorithm identifier||First key length||First key update time||Bit 2||Second security algorithm identifier||Second key length||Second key update time, where when the bit 1 is 0, it indicates that the first security does not need to be protected; when the bit 1 is 1, it indicates that the first security needs to be protected, and the first security algorithm identifier is used to represent the used first security algorithm; when the bit 2 is 0, it indicates that the second security does not need to be protected; when the bit 2 is 1, it indicates that the second security needs to be protected, and the second security algorithm identifier is used to represent the used second security algorithm. Alternatively, a manner is: Security policy=First security algorithm identifier||First key length||Second security algorithm identifier||Second key length. Alternatively, a manner is: Security policy=First security algorithm identifier||Second security algorithm identifier||Key length||H, and in this case, key lengths of two securities are the same.

In this embodiment of the present disclosure, the security policy may be an air interface security policy or a session security policy. When the security policy is used to protect security between the terminal device and the access network node (including uplink and downlink), the security policy is the air interface security policy. When the security policy is used to protect security between the terminal device and the user plane node (including uplink and downlink), the security policy is the session security policy. A core network security policy includes a session security policy and an air interface security policy.

In this embodiment of the present disclosure, the security policy and the at least one key obtained by the first device are the same as those obtained by the second device. For example, the security policy obtained by the first device is "Bit 1||First security algorithm identifier||First key length||First key update time||Bit 2||Second security algorithm identifier||Second key length||Second key update time bit", and the security policy obtained by the second device is also "Bit 1||First security algorithm identifier||First key length||First key update time||Bit 2||Second security algorithm identifier||Second key length||Second key update time bit". The at least one key obtained by the first device is "0011 0011 1011 1101", and the at least one key obtained by the second device is "0011 0011 1011 1101".

In this embodiment of the present disclosure, the first device and the second device may obtain the security policy from the policy controller, and the first device and the second device may obtain the at least one key from an authentication service network element. A method for obtaining the security policy by the first device and the second device from the policy controller, and a method for obtaining the at least one key by the first device and the second device from the authentication service network element are described in detail later, and are not described herein.

It may be understood that, the first device and the second device may further obtain the security policy from another network element in addition to the policy controller. For example, if the policy controller has sent the security policy to a third-party network element, the first device and the second device may obtain the security policy from the third-party network element. Alternatively, if the policy controller has sent the security policy to the second device, the first device may directly request the security policy from the second device.

230. The first device performs security protection on session data of the session using the at least one key based on the security policy of the session, to obtain protected data.

In this embodiment of the present disclosure, the protected data may be any one of header data, payload data, or a packet. The header data is used to record information about the session data, the payload data is used to record the real session data, and the packet includes the header data and the payload data. To be more specific, the protected data may be a part or an entirety of the packet. The first device performs security protection on only the header data or the payload data. This can not only protect the security of the session, but also can avoid a huge computation amount caused by performing security protection on the entire packet. In addition, usually, a data amount of the header data is far less than a data amount of the packet. Therefore, performing security protection on only the header data can greatly reduce the computation amount in security protection. Performing security protection on the entire packet by the first device can increase difficulty in cracking and improve reliability of security protection. In actual use, security protection may be selectively performed on the header data, the payload data, or the packet according to a requirement.

Figure 3A:
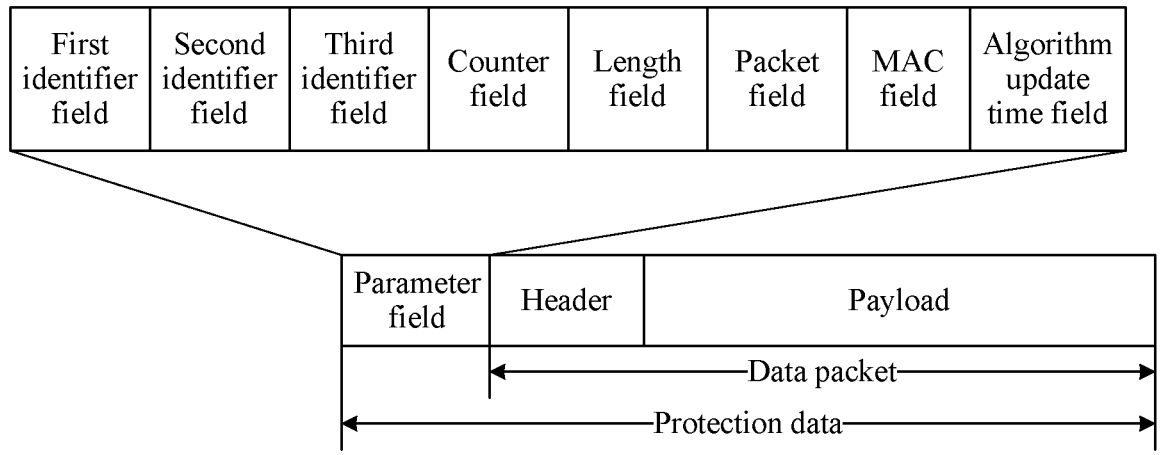
FIG. 3A is a first schematic structural diagram of a packet according to an embodiment of the present disclosure.
Figure 3B:
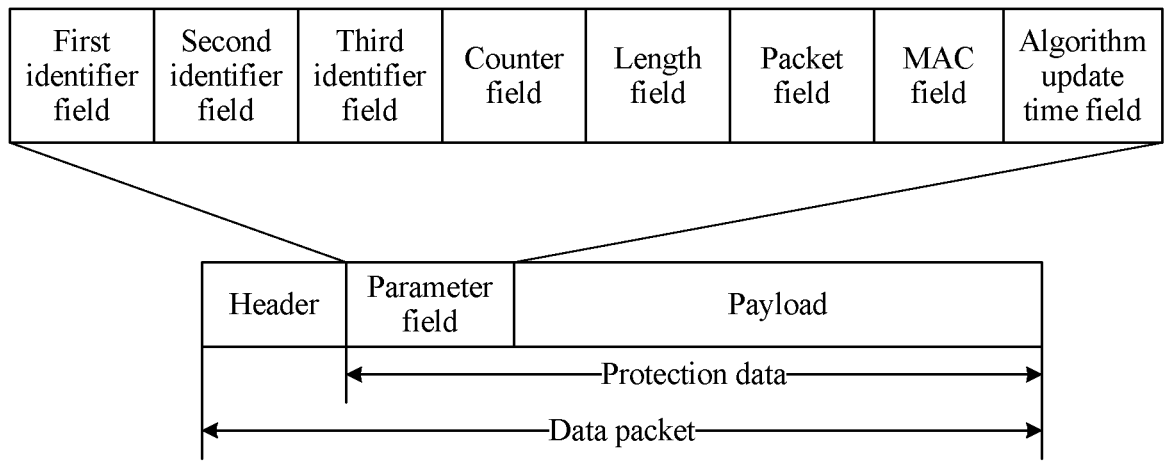
FIG. 3B is a second schematic structural diagram of a packet according to an embodiment of the present disclosure.

In some optional embodiments, as shown in FIG. 3A and FIG. 3B, the protected data further includes a parameter field, where the parameter field includes at least one of a first identifier field, a second identifier field, or a third identifier field. The first identifier field is used to indicate that a current message is a session message. The second identifier field is used to indicate at least one of a service identifier, the session identifier, a bearer identifier, a flow identifier, or a slice identifier. The third identifier field is used to indicate the protection mode of the session. The parameter field further includes a counter, and in addition, may further include at least one of a length field, a padding field, a MAC field, or an algorithm update time field. The counter is used to indicate a sequence number of the packet. The length field is used to indicate a length of the parameter field, or a length of the entire packet, or a length of the payload. When the padding field is used for encryption, the padding field satisfies a requirement of an encryption algorithm on a message length. The MAC field is an integrity protection parameter after data integrity is protected. The algorithm update time field is used to indicate a time of updating the algorithm. When the protected data is the packet, a format of the protected data may be shown in FIG. 3A. When the protected data is the payload, a format of the protected data may be shown in FIG. 3B. Formats of the protected data shown in FIG. 3A and FIG. 3B are merely examples for description, and do not constitute specific limitations to this embodiment of the present disclosure.

Figure 4:
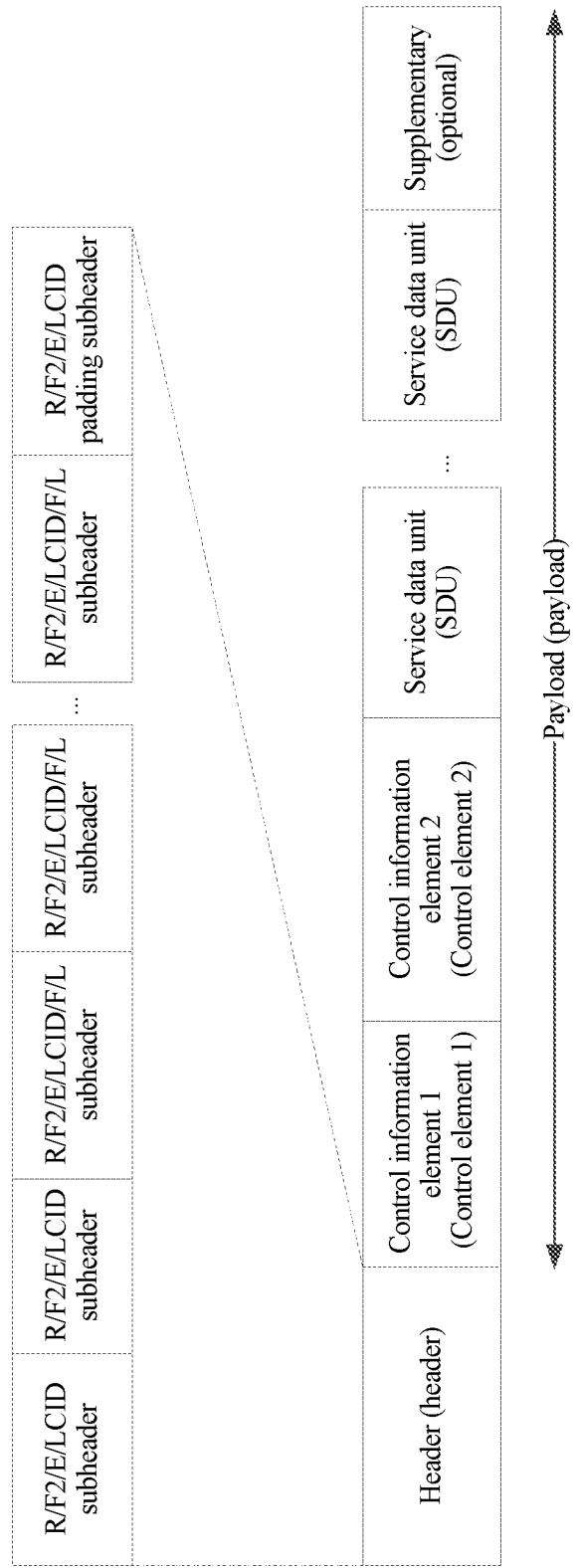
FIG. 4 is a schematic structural diagram of a protocol data unit according to an embodiment of the present disclosure.

It should be understood that, all protected data is protocol data units (PDUs) in essence. FIG. 4 shows a possible protected data PDU. As shown in FIG. 4, a PDU includes a PDU header, zero or more service data units (SDUs), and zero or more information control elements, and may further include a padding bit. A PDU header may include one or more subheaders, and a subheader includes six fields (R/R/E/LCID/F/L) or four fields (R/R/E/LCID).

In this embodiment of the present disclosure, a manner of adding a parameter field to the protected data may be as follows.

In a possible implementation, the first device may add one or more information control elements (generated at a current protocol layer) to a PDU, and use the added information control element to carry a parameter field. It should be understood that, parameter fields may be carried in one information control element, or may be carried in different information control elements respectively.

In another possible implementation, the first device may use a parameter field to carry one or more SDUs (generated at an upper protocol layer) in the protected data. Because the SDU comes from the upper layer, the first device may add the parameter field to an upper-layer message. It should be understood that, parameter fields may be carried in one SDU, or may be carried in different SDUs respectively. When the parameter fields are carried in a plurality of SDUs, the parameter fields may be carried in a plurality of continuous SDUs, or may be carried in a plurality of discontinuous SDUs. In the foregoing example, the PDU is used as an example for description. In actual use, an IP packet, an Ethernet packet, or another non-IP packet may alternatively be used. This is not specifically limited in the present disclosure.

It may be understood that, the counter is a mandatory parameter field, and the length field is an optional parameter field. When the security policy includes confidentiality protection, the packet field is an optional parameter field. When the security policy includes integrity protection, the MAC field is a mandatory parameter field, and the algorithm update time field is an optional parameter field.

240. The first device sends the protected data to the second device.

Figure 5:
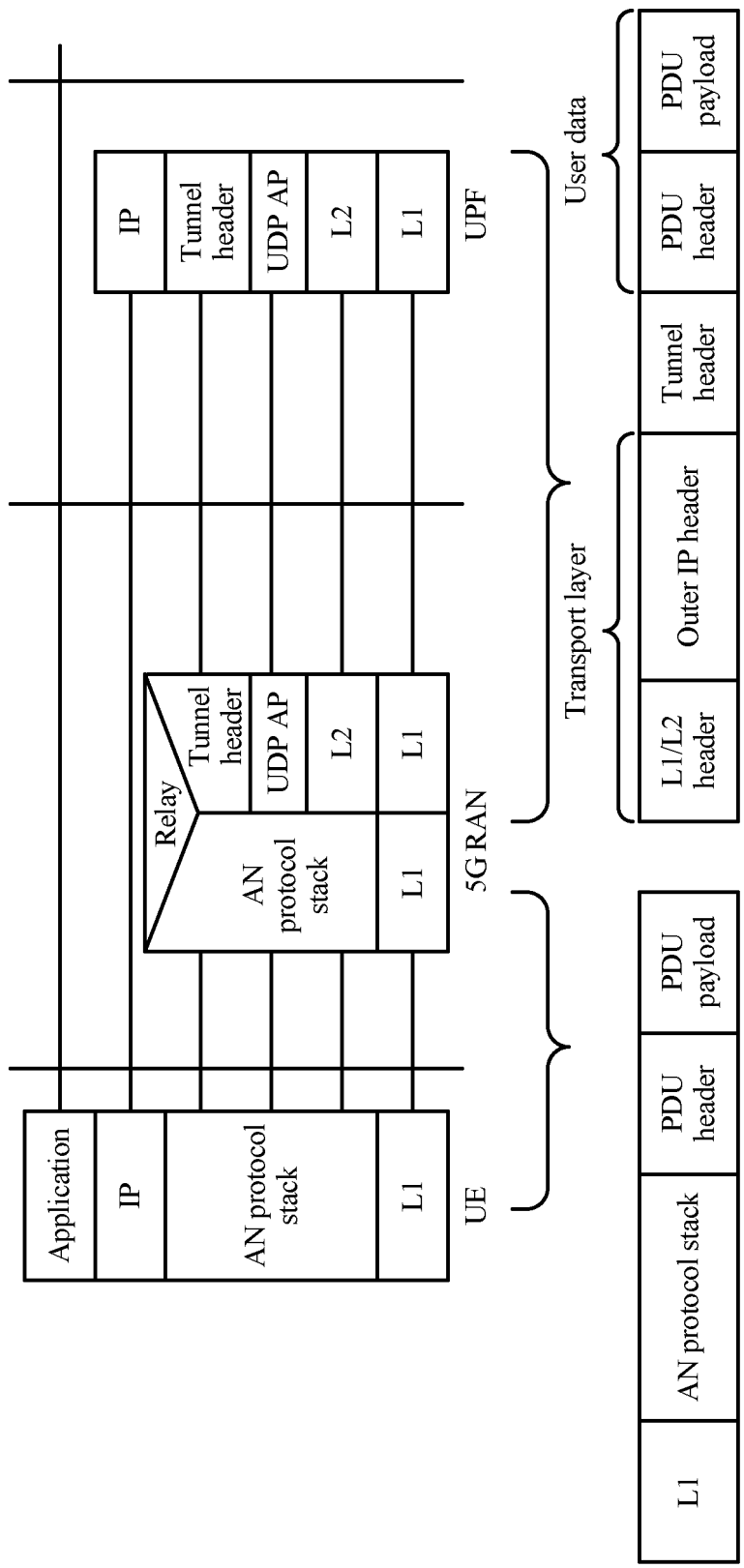
FIG. 5 is a schematic diagram of a protocol stack and an encapsulation packet according to an embodiment of the present disclosure.

In this embodiment of the present disclosure, if the first device is the terminal device, and the second device is the access network node, when the first device sends the protected data to the second device, the protected data needs to pass through a transmission link "terminal device—access network node". If the first device is the terminal device, and the second device is the user plane node, when the first device sends the protected data to the second device, the protected data needs to pass through a transmission link "terminal device—access network node—user plane node". The packet is a basic unit for transmitting the protected data. In order that the packet can be transmitted through a corresponding protocol stack, the packet needs to be encapsulated based on the protocol stack into an encapsulation packet complying with a format of the protocol stack. A transmission protocol stack may be a protocol stack format in Long-Term Evolution (LTE), and include MAC, Radio Link Control (RLC), and Packet Data Convergence Protocol (PDCP) layers, or may be a protocol stack format in next-generation mobile communications. This is not limited herein. For example, in order that the packet can be transmitted in the transmission link "terminal device—access network node", the packet needs to be encapsulated based on the protocol stack into an encapsulation packet in a format shown on the left of FIG. 5. As shown on the left of FIG. 5, an encapsulation packet includes a layer 1 (L1) header, a transmission protocol stack (e.g., AN protocol stack) header, and a packet. The packet includes a PDU header and a PDU payload. In order that the packet can be transmitted in the transmission link "access network node—user plane node", the packet needs to be encapsulated based on the protocol stack into an encapsulation packet in a format shown on the right of FIG. 5. As shown on the right of FIG. 5, an encapsulation packet includes an L1/L2 header, an outer IP header, an encapsulation header, a PDU header, and a packet. The packet includes a PDU header and a PDU payload.

250. The second device receives the protected data that is of the session and is sent by the first device.

260. The second device determines a session identifier of the session, and identifies, based on the session identifier of the session, the protected data that is of the session and is sent by the first device.

In this embodiment of the present disclosure, a manner of determining the session identifier of the session by the second device when the second device is the access network node is different from a manner of determining the session identifier of the session by the second device when the second device is the user plane node. The manner of determining the session identifier of the session by the second device when the second device is the access network node and the manner of determining the session identifier of the session by the second device when the second device is the user node are described in detail later, and are not described temporarily herein.

It may be understood that, the method for determining the session identifier is related to the format of the encapsulation packet sent to the second device. For details, refer to the following description. Details are not described temporarily herein.

270. The second device restores the protected data using the at least one key based on the security policy of the session to obtain the session data, and/or performs an integrity check.

It should be noted that, end-to-end communication protection in this application includes end-to-end protection of the session, and also includes end-to-end protection based on a slice, a flow, or a bearer. For example, in a slice procedure, the second device may be a user plane processing network element in the slice.

The following describes several main implementations of obtaining a security policy by a first device and a second device from a policy controller according to embodiments of the present disclosure with reference to FIG. 6A to FIG. 6D.

Figure 6A:
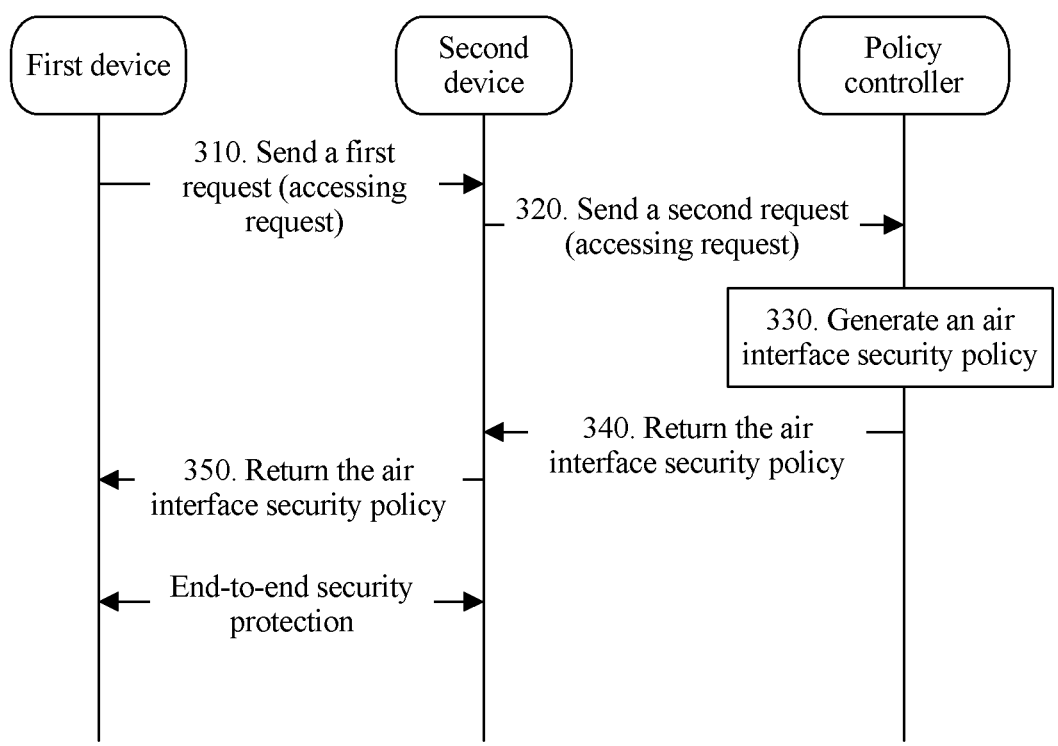
FIG. 6A is a first interaction diagram for obtaining a security policy by a first device and a second device from a policy controller according to an embodiment of the present disclosure.

In a first manner, as shown in FIG. 6A, when a first device is a terminal device, and a second device is an access network node, a method for obtaining a security policy by the first device and the second device from a policy controller includes the following steps.

310. A first device sends a first request to a second device, where the first request includes a first device identity, and a security capability of the first device and a service security requirement, and where the first request may further optionally include a service identifier, or the like. Correspondingly, the second device receives the first request sent by the first device.

In this embodiment of the present disclosure, the first device identity is used to represent an identity of the first device or a user that sends the first request. For example, the first device identity may be a MAC address, an IP address, a mobile phone number, an international mobile equipment identity (IMEI), an international mobile subscriber identity (IMSI), an IP multimedia private identity (IMPI), a temporary mobile subscriber identity (TMSI), an IP multimedia public identity (IMPU), or a globally unique temporary UE identity (GUTI).

In this embodiment of the present disclosure, the security capability of the first device is used to represent at least one of a security algorithm, a key length, or a key update period that can be supported by the first device. It may be understood that, because different devices have different storage capacities and operation speeds, different devices support different security algorithms, key lengths, and key update periods. For example, because a storage capacity of an IoT device is not large, and an operation speed thereof is not high either, the IoT device cannot support a security algorithm of relatively high complexity, because a storage capacity of a smartphone is large, and an operation speed thereof is also high, the smartphone can support a security algorithm of relatively high complexity. Therefore, the first device needs to notify a policy controller of the security capability of the first device such that the policy controller generates a security policy with reference to the security capability of the first device.

In this embodiment of the present disclosure, the service security requirement is used to represent at least one of a security algorithm, a key length, or a key update period that are acceptable by a service. It may be understood that, different services have different requirements on the security algorithm, the key length, and the key update period. For example, a financial service has a relatively high requirement on the security algorithm, but a video download service has a relatively low requirement on the security algorithm. Therefore, the first device needs to notify the policy controller of the service security requirement such that the policy controller generates the security policy with reference to the service security requirement.

In this embodiment of the present disclosure, the first request may be an access request, or may be a session request. A function of the access request includes but is not limited to the following description used to trigger a random access process such that the first device accesses an operator network by performing the random access process. Before the random access process, the first device is in a Radio Resource Control (RRC) idle mode (RRC_IDLE). After performing the initial random access process, the first device changes from the RRC idle mode (RRC_IDLE) to an RRC connected mode (RRC_CONNECTED). The session request is used to request to establish a session between the first device and the second device. For example, the session is established using a session establishment protocol. In this case, the session request is session establishment request signaling.

320. The second device sends a second request to a policy controller. The second request includes the first device identity, the security capability of the first device and the service security requirement, and a security capability of an access network node. Correspondingly, the policy controller receives the second request sent by the second device.

In this embodiment of the present disclosure, the second request further includes a security requirement of the access network node in addition to the first device identity, and the security capability of the first device and the service security requirement. It may be understood that, if the first request further includes the service identifier, the second request also includes the service identifier. The second request is generated based on the first request. Therefore, when the first request is an access request, the second request is also an access request, or when the first request is a session request, the second request is also a session request. It is also possible that the first request is an access request but the second request is a session request. It may be understood that, specific names of the first request and the second request are not limited.

In this embodiment of the present disclosure, the security capability of the access network node is used to represent at least one of a security algorithm, a key length, or a key update period that can be provided by the access network node. It may be understood that, because different access network nodes have different storage capacities and operation speeds, different access network nodes support different security algorithms, key lengths, and key update periods. For example, when the access network node is a Wi-Fi hotspot, the Wi-Fi hotspot cannot support a security algorithm of relatively high complexity. When the access network node is a base station, the base station can support a security algorithm of relatively high complexity.

330. The policy controller generates an air interface security policy based on the second request.

In this embodiment of the present disclosure, the policy controller may generate the air interface security policy based on the security capability of the first device, the service security requirement of the first device, and the security capability of the access network node. Alternatively, the policy controller may generate the air interface security policy based on at least one of the service security requirement of the first device or the security capability of the access network node only.

Further, the policy controller may further generate the air interface security policy with reference to a preset security capability. The preset security capability is returned to the policy controller by an AUSF or an ARPF based on the first device identity and/or the service identifier sent by the policy controller.

Further, the policy controller may further generate the air interface security policy with reference to a security requirement of a server. The security requirement of the server is returned to the policy controller by the server based on the first device identity and/or the service identifier sent by the policy controller. The server is a device providing a service to the terminal device. The server includes but is not limited to an application server, a print server, a web server, a File Transfer Protocol (FTP) server, an e-commerce server, a database server, a real-time communications server, a file server, an email server, or the like.

In an embodiment, the air interface security policy is determined according to the following preset rule determining the security policy based on content of one or more security requirements. If the security policy is determined based on content of one security requirement only, content of the security policy is the same as the content of the security requirement. If the security policy is determined based on content of a plurality of security requirements, the following principles may be complied with.

1. Determine the security policy by complying with a principle of higher security, that is, using content of higher security in the content of the plurality of security requirements as content of the security policy.

For example, if a protection key length in content of a security requirement 1 is 64, but a protection key length in content of a security requirement 2 is 128, 128 is used as a protection key length of the security policy.

2. Determine the security policy by complying with a principle of saving more resources, that is, using content of saving more resources in the content of the plurality of security requirements as content of the security policy. For example, if content of each security requirement includes an encryption algorithm, but integrity protection algorithms in content of some security requirements are null, content of the security policy includes an encryption algorithm but does not include an integrity protection algorithm.

3. Determine the security policy by complying with a priority of a security requirement. To be more specific, if a security requirement specifies an algorithm priority, the algorithm priority is used as a basis for security algorithm negotiation, and a finally selected algorithm is an algorithm supported by all the security requirements, the algorithm has a highest priority, and this is used as content of the security policy.

Alternatively, the security policy is negotiated mainly based on a priority of a security requirement. For example, priorities of several encryption algorithms are specified in the security requirement 2, and an encryption algorithm to be used in the security policy is determined based on the specification of the priorities.

Alternatively, if the plurality of security requirements all specify priorities of algorithms, an algorithm priority of a security requirement may be used as a main priority. For example, a priority of the security requirement 2 is a main priority.

340. The policy controller returns the air interface security policy to the second device. Correspondingly, the second device receives the air interface security policy sent by the policy controller.

350. The second device returns the air interface security policy to the first device. Correspondingly, the first device receives the air interface security policy sent by the second device.

Figure 6B:
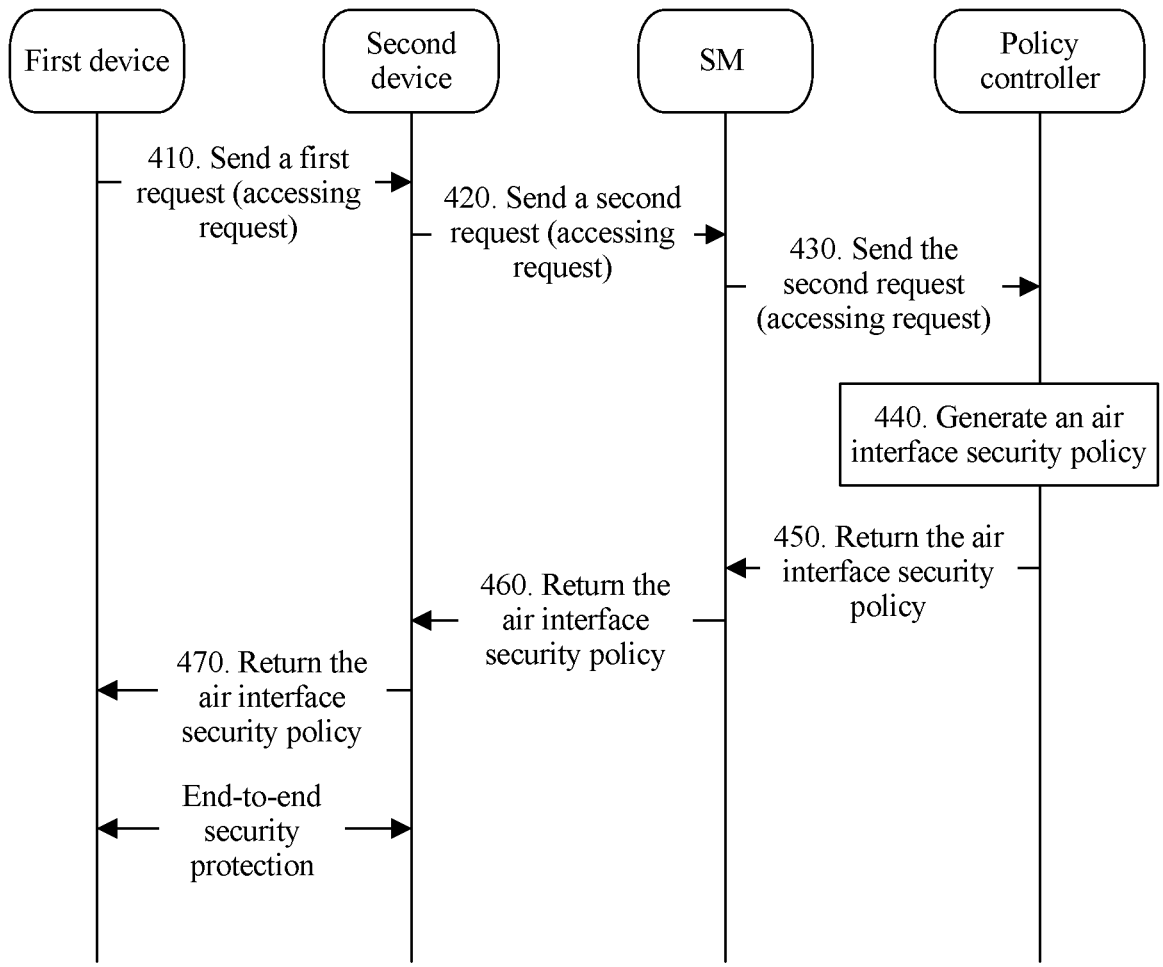
FIG. 6B is a second interaction diagram for obtaining a security policy by a first device and a second device from a policy controller according to an embodiment of the present disclosure.

In a second manner, as shown in FIG. 6B, when a first device is a terminal device, and a second device is an access network node, a method for obtaining a security policy by the first device and the second device from a policy controller includes the following steps.

410. A first device sends a first request to a second device, where the first request includes a first device identity of the first device, a security capability of the first device, and a service security requirement of the first device, and where the first request may further optionally include a service identifier, or the like. Correspondingly, the second device receives the first request sent by the first device.

In this embodiment of the present disclosure, the first device identity is used to represent an identity of the first device or a user that sends the first request. For example, the first device identity may be a MAC address, an IP address, a mobile phone number, an IMEI, an IMSI, an IMPI, a TMSI, an IMPU, or a GUTI.

In this embodiment of the present disclosure, the security capability of the first device is used to represent at least one of a security algorithm, a key length, or a key update period that can be supported by the first device. It may be understood that, because different devices have different storage capacities and operation speeds, different devices support different security algorithms, key lengths, and key update periods. For example, because a storage capacity of an IoT device is not large, and an operation speed thereof is not high either, the IoT device cannot support a security algorithm of relatively high complexity, because a storage capacity of a smartphone is large, and an operation speed thereof is also high, the smartphone can support a security algorithm of relatively high complexity. Therefore, the first device needs to notify a policy controller of the security capability of the first device such that the policy controller generates a security policy with reference to the security capability of the first device.

In this embodiment of the present disclosure, the service security requirement is used to represent at least one of a security algorithm, a key length, or a key update period that are acceptable by a service. It may be understood that, different services have different requirements on the security algorithm, the key length, and the key update period. For example, a financial service has a relatively high requirement on the security algorithm, but a video download service has a relatively low requirement on the security algorithm. Therefore, the first device needs to notify the policy controller of the service security requirement such that the policy controller generates the security policy with reference to the service security requirement.

In this embodiment of the present disclosure, the first request may be an access request, or may be a session request. A function of the access request includes but is not limited to the following description, used to trigger a random access process such that the first device accesses an operator network by performing the random access process. Before the random access process, the first device is in an RRC idle mode (RRC_IDLE). After performing the initial random access process, the first device changes from the RRC idle mode (RRC_IDLE) to an RRC connected mode (RRC_CONNECTED). The session request is used to request to establish a session between the first device and the second device. For example, the session is established using a session establishment protocol. In this case, the session request is session establishment request signaling.

420. The second device sends a second request to a session management network element. The second request includes the first device identity, the security capability of the first device, and the service security requirement, and a security capability of an access network node. Correspondingly, the session management network element receives the second request sent by the second device.

In this embodiment of the present disclosure, the second request is generated based on the first request. When the first request is an access request, the second request is also an access request, or when the first request is a session request, the second request is also a session request. It is also possible that the first request is an access request but the second request is a session request. It may be understood that, specific names of the first request and the second request are not limited. The second request further includes a security requirement of the access network node in addition to the first device identity, and the security capability of the first device and the service security requirement. It may be understood that, if the first request further includes the service identifier, the second request also includes the service identifier. It may be understood that, specific names of the first request and the second request are not limited.

In this embodiment of the present disclosure, the security capability of the access network node is used to represent at least one of a security algorithm, a key length, or a key update period that can be provided by the access network node. It may be understood that, because different access network nodes have different storage capacities and operation speeds, different access network nodes support different security algorithms, key lengths, and key update periods. For example, when the access network node is a Wi-Fi hotspot, the Wi-Fi hotspot cannot support a security algorithm of relatively high complexity. When the access network node is a base station, the base station can support a security algorithm of relatively high complexity.

430. The session management network element forwards the second request to a policy controller. Correspondingly, the policy controller receives the second request sent by the session management network element.

440. The policy controller generates an air interface security policy based on the second request.

In this embodiment of the present disclosure, the policy controller may generate the air interface security policy based on the security capability of the first device, the service security requirement, and the security capability of the access network node. Alternatively, the policy controller may generate the air interface security policy based on at least one of the service security requirement of the first device or the security capability of the access network node only.

Further, the policy controller may further generate the air interface security policy with reference to a preset security capability. The preset security capability is returned to the policy controller by an AUSF or an ARPF based on the first device identity and/or the service identifier sent by the policy controller.

Further, the policy controller may further generate the air interface security policy with reference to a security requirement of a server. The security requirement of the server is returned to the policy controller by the server based on the first device identity and/or the service identifier sent by the policy controller. The server is a device providing a service to the terminal device. The server includes but is not limited to an application server, a print server, a web server, an FTP server, an e-commerce server, a database server, a real-time communications server, a file server, an email server, or the like.

In an embodiment, the air interface security policy is determined according to the following preset rule determining the security policy based on content of one or more security requirements. If the security policy is determined based on content of one security requirement only, content of the security policy is the same as the content of the security requirement. If the security policy is determined based on content of a plurality of security requirements, the following principles may be complied with.

1. Determine the security policy by complying with a principle of higher security, that is, using content of higher security in the content of the plurality of security requirements as content of the security policy.

For example, if a protection key length in content of a security requirement 1 is 64, but a protection key length in content of a security requirement 2 is 128, 128 is used as a protection key length of the security policy.

2. Determine the security policy by complying with a principle of saving more resources, that is, using content of saving more resources in the content of the plurality of security requirements as content of the security policy. For example, if content of each security requirement includes an encryption algorithm, but integrity protection algorithms in content of some security requirements are null, content of the security policy includes an encryption algorithm, but does not include an integrity protection algorithm.

3. Determine the security policy by complying with a priority of a security requirement. To be more specific, if a security requirement specifies an algorithm priority, the algorithm priority is used as a basis for security algorithm negotiation, and a finally selected algorithm is an algorithm supported by all the security requirements, the algorithm has a highest priority, and this is used as content of the security policy.

Alternatively, the security policy is negotiated mainly based on a priority of a security requirement. For example, priorities of several encryption algorithms are specified in the security requirement 2, and an encryption algorithm to be used in the security policy is determined based on the specification of the priorities.

Alternatively, if the plurality of security requirements all specify priorities of algorithms, an algorithm priority of a security requirement may be used as a main priority. For example, a priority of the security requirement 2 is a main priority.

450. The policy controller sends the air interface security policy to the session management network element. Correspondingly, the session management network element receives the air interface security policy sent by the policy controller.

460. The session management network element returns the air interface security policy to the second device. Correspondingly, the second device receives the air interface security policy sent by the session management network element.

470. The second device returns the air interface security policy to the first device. Correspondingly, the first device receives the air interface security policy returned by the second device.

Figure 6C:
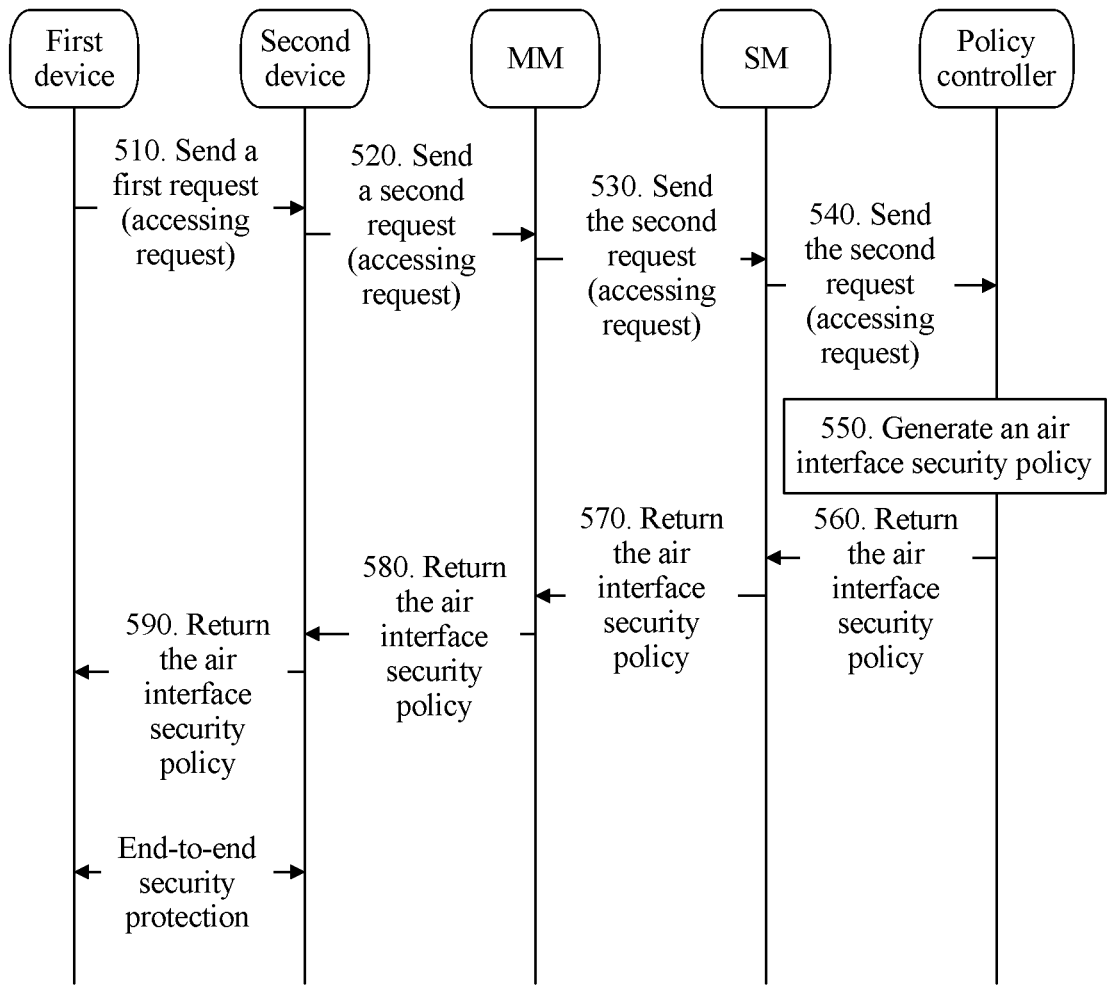
FIG. 6C is a third interaction diagram for obtaining a security policy by a first device and a second device from a policy controller according to an embodiment of the present disclosure.

In a third manner, as shown in FIG. 6C, when a first device is a terminal device, and a second device is an access network node, a method for obtaining a security policy by the first device and the second device from a policy controller includes the following steps.

510. A first device sends a first request to a second device, where the first request includes a first device identity, a security capability of the first device, and a service security requirement, and where the first request may further optionally include a service identifier, or the like. Correspondingly, the second device receives the first request sent by the first device.

In this embodiment of the present disclosure, the first device identity is used to represent an identity of the first device or a user that sends the first request. For example, the first device identity may be a MAC address, an IP address, a mobile phone number, an IMEI, an IMSI, an IMPI, a TMSI, an IMPU, or a GUTI.

In this embodiment of the present disclosure, the security capability of the first device is used to represent at least one of a security algorithm, a key length, or a key update period that can be supported by the first device. It may be understood that, because different devices have different storage capacities and operation speeds, different devices support different security algorithms, key lengths, and key update periods. For example, because a storage capacity of an IoT device is not large, and an operation speed thereof is not high either, the IoT device cannot support a security algorithm of relatively high complexity, because a storage capacity of a smartphone is large, and an operation speed thereof is also high, the smartphone can support a security algorithm of relatively high complexity. Therefore, the first device needs to notify a policy controller of the security capability of the first device such that the policy controller generates a security policy with reference to the security capability of the first device.

In this embodiment of the present disclosure, the service security requirement is used to represent at least one of a security algorithm, a key length, or a key update period that are acceptable by a service. It may be understood that, different services have different requirements on the security algorithm, the key length, and the key update period. For example, a financial service has a relatively high requirement on the security algorithm, but a video download service has a relatively low requirement on the security algorithm. Therefore, the first device needs to notify the policy controller of the service security requirement such that the policy controller generates the security policy with reference to the service security requirement.

In this embodiment of the present disclosure, the first request may be an access request, or may be a session request. A function of the access request includes but is not limited to the following description, used to trigger a random access process such that the first device accesses an operator network by performing the random access process. Before the random access process, the first device is in an RRC idle mode (RRC_IDLE). After performing the initial random access process, the first device changes from the RRC idle mode (RRC_IDLE) to an RRC connected mode (RRC_CONNECTED). The session request is used to request to establish a session between the first device and the second device. For example, the session is established using a session establishment protocol. In this case, the session request is session establishment request signaling.

520. The second device sends a second request to a mobility management network element. The second request includes the first device identity, the security capability of the first device, the service security requirement, and a security requirement of an access network node. Correspondingly, the mobility management network element receives the second request sent by the second device.

In this embodiment of the present disclosure, the second request is generated based on the first request. When the first request is an access request, the second request is also an access request, or when the first request is a session request, the second request is also an access request. It is also possible that the first request is an access request but the second request is a session request. It may be understood that, specific names of the first request and the second request are not limited. The second request further includes a security requirement of the access network node in addition to the first device identity, the security capability of the first device, and the service security requirement. It may be understood that, if the first request further includes the service identifier, the second request also includes the service identifier. It may be understood that, specific names of the first request and the second request are not limited.

In this embodiment of the present disclosure, the security capability of the access network node is used to represent at least one of a security algorithm, a key length, or a key update period that can be provided by the access network node. It may be understood that, because different access network nodes have different storage capacities and operation speeds, different access network nodes support different security algorithms, key lengths, and key update periods. For example, when the access network node is a Wi-Fi hotspot, the Wi-Fi hotspot cannot support a security algorithm of relatively high complexity. When the access network node is a base station, the base station can support a security algorithm of relatively high complexity.

530. The mobility management network element forwards the second request to a session management network element. Correspondingly, the session management network element receives the second request sent by the mobility management network element.

540. The session management network element forwards the second request to a policy controller. Correspondingly, the policy controller receives the second request sent by the session management network element.

550. The policy controller generates an air interface security policy based on the second request.

In this embodiment of the present disclosure, the policy controller may generate the air interface security policy based on the security capability of the first device, the service security requirement, and the security capability of the access network node. Alternatively, the policy controller may generate the air interface security policy based on at least one of the service security requirement or the security capability of the access network node only.

Further, the policy controller may further generate the air interface security policy with reference to a preset security capability. The preset security capability is returned to the policy controller by an AUSF or an ARPF based on the first device identity and/or the service identifier sent by the policy controller.

Further, the policy controller may further generate the air interface security policy with reference to a security requirement of a server. The security requirement of the server is returned to the policy controller by the server based on the first device identity and/or the service identifier sent by the policy controller. The server is a device providing a service to the terminal device. The server includes but is not limited to an application server, a print server, a web server, an FTP server, an e-commerce server, a database server, a real-time communications server, a file server, an email server, or the like.

In an embodiment, the air interface security policy is determined according to the following preset rule determining the security policy based on content of one or more security requirements. If the security policy is determined based on content of one security requirement only, content of the security policy is the same as the content of the security requirement. If the security policy is determined based on content of a plurality of security requirements, the following principles may be complied with.

1. Determine the security policy by complying with a principle of higher security, that is, using content of higher security in the content of the plurality of security requirements as content of the security policy.

For example, if a protection key length in content of a security requirement 1 is 64, but a protection key length in content of a security requirement 2 is 128, 128 is used as a protection key length of the security policy.

2. Determine the security policy by complying with a principle of saving more resources, that is, using content of saving more resources in the content of the plurality of security requirements as content of the security policy. For example, if content of each security requirement includes an encryption algorithm, but integrity protection algorithms in content of some security requirements are null, content of the security policy includes an encryption algorithm, but does not include an integrity protection algorithm.

3. Determine the security policy by complying with a priority of a security requirement. To be more specific, if a security requirement specifies an algorithm priority, the algorithm priority is used as a basis for security algorithm negotiation, and a finally selected algorithm is an algorithm supported by all the security requirements, the algorithm has a highest priority, and this is used as content of the security policy.

Alternatively, the security policy is negotiated mainly based on a priority of a security requirement. For example, priorities of several encryption algorithms are specified in the security requirement 2, and an encryption algorithm to be used in the security policy is determined based on the specification of the priorities.

Alternatively, if the plurality of security requirements all specify priorities of algorithms, an algorithm priority of a security requirement may be used as a main priority. For example, a priority of the security requirement 2 is a main priority.

560. The policy controller sends the air interface security policy to the session management network element. Correspondingly, the session management network element receives the air interface security policy sent by the policy controller.

570. The session management network element returns the air interface security policy to the mobility management network element. Correspondingly, the mobility management network element receives the air interface security policy sent by the session management network element.

580. The mobility management network element returns the air interface security policy to the second device. Correspondingly, the second device receives the air interface security policy sent by the mobility management network element.

590. The second device returns the air interface security policy to the first device. Correspondingly, the first device receives the air interface security policy returned by the second device.

Figure 6D:
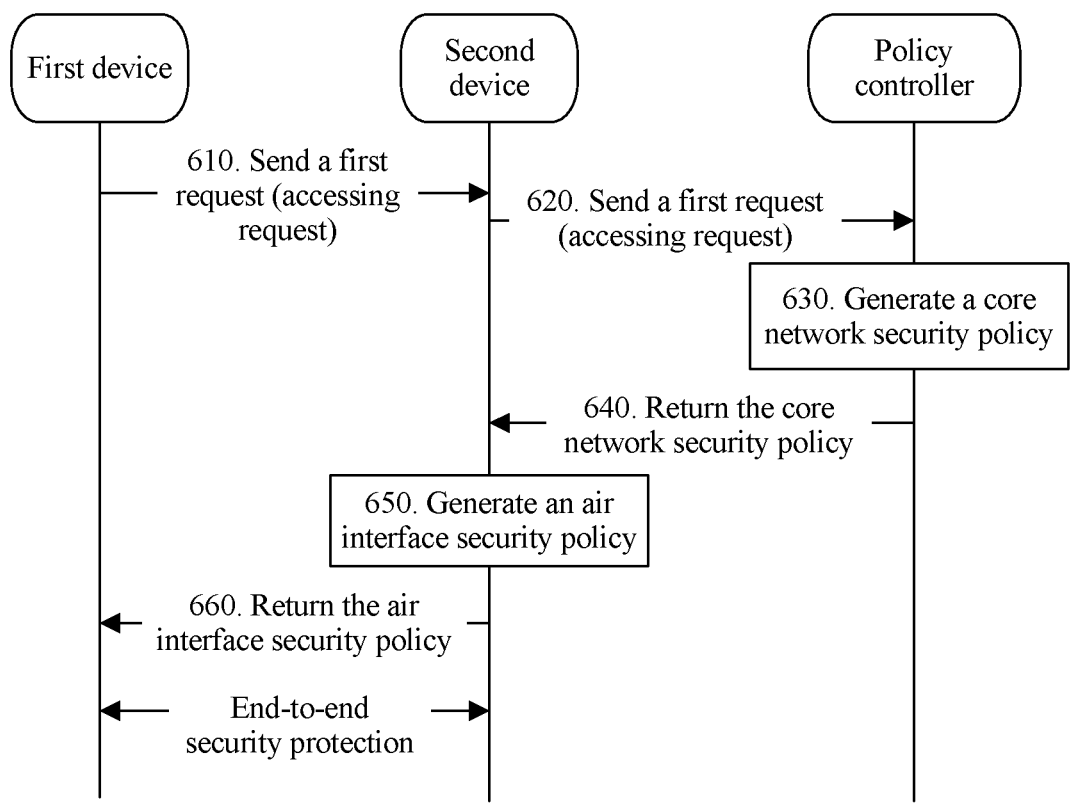
FIG. 6D is a fourth interaction diagram for obtaining a security policy by a first device and a second device from a policy controller according to an embodiment of the present disclosure.

In a fourth manner, as shown in FIG. 6D, when a first device is a terminal device, and a second device is an access network node, a method for obtaining a security policy by the first device and the second device from a policy controller includes the following steps.

610. A first device sends a first request to a second device, where the first request includes a first device identity, a security capability of the first device and a service security requirement of the first device, and where the first request may further optionally include a service identifier, or the like. Correspondingly, the second device receives the first request sent by the first device.

In this embodiment of the present disclosure, the first device identity is used to represent an identity of the first device or a user that sends the first request. For example, the first device identity may be a MAC address, an IP address, a mobile phone number, an IMEI, an IMSI, an IMPI, a TMSI, an IMPU, or a GUTI.

In this embodiment of the present disclosure, the security capability of the first device is used to represent at least one of a security algorithm, a key length, or a key update period that can be supported by the first device. It may be understood that, because different devices have different storage capacities and operation speeds, different devices support different security algorithms, key lengths, and key update periods. For example, because a storage capacity of an IoT device is not large, and an operation speed thereof is not high either, the IoT device cannot support a security algorithm of relatively high complexity, because a storage capacity of a smartphone is large, and an operation speed thereof is also high, the smartphone can support a security algorithm of relatively high complexity. Therefore, the first device needs to notify a policy controller of the security capability of the first device such that the policy controller generates a security policy with reference to the security capability of the first device.

In this embodiment of the present disclosure, the service security requirement is used to represent at least one of a security algorithm, a key length, or a key update period that are acceptable by a service. It may be understood that, different services have different requirements on the security algorithm, the key length, and the key update period. For example, a financial service has a relatively high requirement on the security algorithm, but a video download service has a relatively low requirement on the security algorithm. Therefore, the first device needs to notify the policy controller of the service security requirement such that the policy controller generates the security policy with reference to the service security requirement.

In this embodiment of the present disclosure, the first request may be an access request, or may be a session request. A function of the access request includes but is not limited to the following description, used to trigger a random access process such that the first device accesses an operator network by performing the random access process. Before the random access process, the first device is in an RRC idle mode (RRC_IDLE). After performing the initial random access process, the first device changes from the RRC idle mode (RRC_IDLE) to an RRC connected mode (RRC_CONNECTED). The session request is used to request to establish a session between the first device and the second device. For example, the session is established using a Session Initiation Protocol (SIP). In this case, the session request is invite signaling.

620. The second device sends a first request to a policy controller. The second request includes the first device identity, the security capability of the first device, and the service security requirement. Correspondingly, the policy controller receives the second request sent by the second device.

In this embodiment of the present disclosure, the second request is generated based on the first request. When the first request is an access request, the second request is also an access request, or when the first request is a session request, the second request is also an access request. It is also possible that the first request is an access request but the second request is a session request. It may be understood that, specific names of the first request and the second request are not limited.

630. The policy controller generates a core network security policy based on the second request.

In this embodiment of the present disclosure, the policy controller may generate the air interface security policy based on the security capability of the first device and the service security requirement. Alternatively, the policy controller may generate the core network security policy based on the service security requirement only.

Further, the policy controller may further generate the core network security policy with reference to a preset security capability. The preset security capability is returned to the policy controller by an AUSF or an ARPF based on the first device identity and/or the service identifier sent by the policy controller.

Further, the policy controller may further generate the core network security policy with reference to a security requirement of a server. The security requirement of the server is returned to the policy controller by the server based on the first device identity and/or the service identifier sent by the policy controller. The server is a device providing a service to the terminal device. The server includes but is not limited to an application server, a print server, a web server, an FTP server, an e-commerce server, a database server, a real-time communications server, a file server, an email server, or the like.

In an embodiment, the air interface security policy is determined according to the following preset rule determining the security policy based on content of one or more security requirements. If the security policy is determined based on content of one security requirement only, content of the security policy is the same as the content of the security requirement. If the security policy is determined based on content of a plurality of security requirements, the following principles may be complied with.

1. Determine the security policy by complying with a principle of higher security, that is, using content of higher security in the content of the plurality of security requirements as content of the security policy.

For example, if a protection key length in content of a security requirement 1 is 64, but a protection key length in content of a security requirement 2 is 128, 128 is used as a protection key length of the security policy.

2. Determine the security policy by complying with a principle of saving more resources, that is, using content of saving more resources in the content of the plurality of security requirements as content of the security policy. For example, if content of each security requirement includes an encryption algorithm, but integrity protection algorithms in content of some security requirements are null, content of the security policy includes an encryption algorithm, but does not include an integrity protection algorithm.

3. Determine the security policy by complying with a priority of a security requirement. To be more specific, if a security requirement specifies an algorithm priority, the algorithm priority is used as a basis for security algorithm negotiation, and a finally selected algorithm is an algorithm supported by all the security requirements, the algorithm has a highest priority, and this is used as content of the security policy.

Alternatively, the security policy is negotiated mainly based on a priority of a security requirement. For example, priorities of several encryption algorithms are specified in the security requirement 2, and an encryption algorithm to be used in the security policy is determined based on the specification of the priorities.

Alternatively, if the plurality of security requirements all specify priorities of algorithms, an algorithm priority of a security requirement may be used as a main priority. For example, a priority of the security requirement 2 is a main priority.

640. The policy controller returns the core network security policy to the second device. Correspondingly, the second device receives the core network security policy sent by the policy controller.

650. The second device determines an air interface security policy with reference to the core network security policy and a security capability of an access network node.

In this embodiment of the present disclosure, the security capability of the access network node is used to represent at least one of a security algorithm, a key length, or a key update period that can be provided by the access network node. It may be understood that, because different access network nodes have different storage capacities and operation speeds, different access network nodes support different security algorithms, key lengths, and key update periods. For example, when the access network node is a Wi-Fi hotspot, the Wi-Fi hotspot cannot support a security algorithm of relatively high complexity. When the access network node is a base station, the base station can support a security algorithm of relatively high complexity.

660. The second device returns the air interface security policy to the first device. Correspondingly, the first device receives the air interface security policy sent by the second device.

Figure 7:
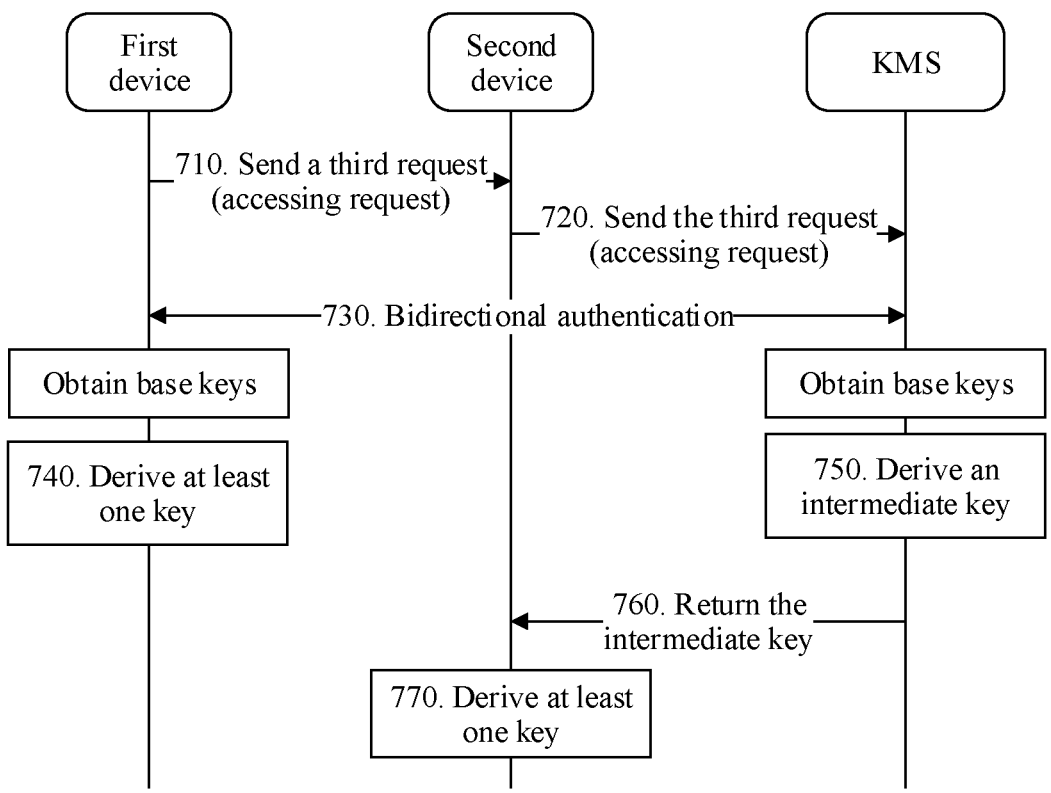
FIG. 7 is an interaction diagram of a method for obtaining at least one key by a first device and a second device from an authentication service network element according to an embodiment of the present disclosure.

With reference to FIG. 7, the following describes an implementation of a method for obtaining at least one key by a first device and a second device from an authentication service network element according to an embodiment of the present disclosure. When the first device is a terminal device and the second device is an access network node, the method for obtaining the at least one key by the first device and the second device from the authentication service network element includes the following steps.

710. A first device sends a third request to a second device. Correspondingly, the second device receives the third request sent by the first device.

In this embodiment of the present disclosure, the third request may be sent before a process in which the first device accesses a network and establishes a context with an MM, or may be sent when the first device accesses a network and establishes a context with an MM, or may be sent when the first device performs bidirectional authentication and an AUSF. Optionally, the third request may be an access request.

In this embodiment of the present disclosure, the third request includes a first device identity or a user identity, where the first device identity is used to represent an identity of the first device sending the first request. For example, the first device identity may be a MAC address, an IP address, a mobile phone number, an IMEI, an IMSI, an IMPI, a TMSI, an IMPU, or a GUTI.

720. The second device sends the third request to an authentication node (a node such as an AUSF or a SEAF). Correspondingly, the authentication node receives the third request sent by the second device.

730. The first device and the authentication node authenticate each other.

In an optional authentication mode, before authentication, the authentication node may send the first device identity to a root key storage center (such as an ARPF), and obtain an authentication vector from the root key storage center. Based on the authentication vector, the first device and the authentication node complete authenticating each other.

In this embodiment of the present disclosure, after the first device and the authentication node perform bidirectional authentication successfully, each of the first device and the authentication node obtains base keys or obtains base keys by performing a derivation or a plurality of derivations.

The authentication node sends the base keys to a KMS.

The KMS may be deployed independently, or may be deployed together with another network element. For example, the KMS is deployed together with an authentication center, an AUSF, an ARPF, an SEAF, an SCMF, an AMF, an SMF, an AN (the second device), an MME, or the like.

740. The first device derives an access key based on the base keys.

In this embodiment of the present disclosure, because content of a security policy may include at least one of an encryption algorithm or an integrity protection algorithm, a key may be calculated based on the security policy and may be used for encryption and/or integrity protection. Alternatively, a key used for confidentiality protection and a key used for integrity protection may be separately calculated. Further, keys may be further classified into an air interface signaling encryption key, an air interface information integrity key, a user plane encryption key, and a user plane integrity protection key according to whether the keys are used for protecting air interface signaling or protecting user plane data.

In this embodiment of the present disclosure, the first device derives an intermediate key based on a first parameter and the base keys. Then the first device generates at least one key based on a second parameter and the intermediate key. The first parameter includes at least one of an identifier of an access network node, an NAS counter, a sequence number for generating the intermediate key, a sequence number of a packet, a nonce 1, a bearer identifier, a flow identifier, a policy set, or a slice identifier. The second parameter includes at least one of an air interface security policy identifier, a security algorithm identifier, an NAS counter, a nonce 2, an air interface resource identifier, an air interface bearer identifier, a flow identifier, a slice identifier, a policy set, or a session identifier. The security algorithm identifier is at least one of an air interface signaling encryption algorithm identifier, an air interface information integrity protection algorithm identifier, a user plane encryption algorithm identifier, or a user plane integrity protection algorithm identifier.

In an embodiment, that the first device derives an intermediate key $K_{an}$ based on a first parameter and the base keys is $K_{an}$=key derivation function (KDF), e.g., at least one of $K_{kms}$, the identifier of the access network node, the NAS counter, the sequence number for generating the intermediate key, the sequence number of the packet, the nonce 1, the bearer identifier, the flow identifier, the policy set, the session identifier, or the slice identifier.

The policy set is the security policy, $K_{kms}$ is the base key, and the nonce 1 is a random parameter.

In an embodiment, that the first device derives an encryption key $K_1$ based on a second parameter and the intermediate key is $K_1$=KDF ($K_{an}$, (at least one of the air interface security policy identifier, the security algorithm identifier, the NAS counter, the nonce 2, the air interface resource identifier, the air interface bearer identifier, the slice identifier, or the session identifier), the policy set); or $K_1$=KDF ($K_{an}$, (at least one of the air interface security policy identifier, the security algorithm identifier, the NAS counter, the nonce 2, the air interface resource identifier, the air interface bearer identifier, the slice identifier, or the session identifier)); or $K_1$=KDF ($K_{an}$, the encryption algorithm ID, (at least one of the air interface security policy identifier, the security algorithm identifier, the NAS counter, the nonce 2, the air interface resource identifier, the air interface bearer identifier, the slice identifier, or the session identifier)); or $K_1$=KDF ($K_{an}$, an encryption identifier, (at least one of the air interface security policy identifier, the security algorithm identifier, the NAS counter, the nonce 2, the air interface resource identifier, the air interface bearer identifier, the slice identifier, or the session identifier)); or $K_1$=KDF ($K_{an}$, the encryption algorithm ID).

The policy set is the security policy, and the $K_{an}$ is the intermediate key.

As described above, the encryption identifier may be a character string, used to identify that a derived result is an encryption key. The nonce 2 is a random parameter, and may be selected by the KMS, or may be added by the first device to a session request. A purpose of using the random parameter for calculation is to improve security and randomicity of the key. It is also possible that at least one of two nonces is included in the key derivation, where one nonce (which is selected by the KMS, and is directly sent to the first device, or is sent to the first device through an SM) comes from the KMS, and where the other nonce comes from the first device (which is added by the first device to a session request).

In an embodiment, that the first device derives an integrity key $K_2$ based on a second parameter and the intermediate key is $K_2$=KDF ($K_{an}$, (at least one of the air interface security policy identifier, the security algorithm identifier, the NAS counter, the nonce 2, the air interface resource identifier, the air interface bearer identifier, the slice identifier, or the session identifier), the policy set); or $K_2$=KDF ($K_{an}$, (at least one of the air interface security policy identifier, the security algorithm identifier, the NAS counter, the nonce 2, the air interface resource identifier, the air interface bearer identifier, the slice identifier, or the session identifier)); or $K_2$=KDF ($K_{an}$, the integrity protection algorithm ID, (at least one of the air interface security policy identifier, the security algorithm identifier, the NAS counter, the nonce 2, the air interface resource identifier, the air interface bearer identifier, the slice identifier, or the session identifier)); or $K_2$=KDF ($K_{an}$, an integrity protection identifier, (at least one of the air interface security policy identifier, the security algorithm identifier, the NAS counter, the nonce 2, the air interface resource identifier, the air interface bearer identifier, the slice identifier, or the session identifier)); or $K_2$=KDF ($K_{an}$, the integrity protection algorithm ID).

The integrity protection identifier may be a character string, used to identify that a derived result is an integrity protection key.

The KDF is a key derivation function, and includes but is not limited to the following key derivation functions, Hash Message Authentication Code (HMAC) (such as HMAC-SHA256 and HMAC-SHA1), Nested Message Authentication Code (NMAC), Cipher Based Message Authentication Code (CMAC), One Key based Message Authentication Code (OMAC), CBC-MAC, PMAC, UMAC, VMAC, HASH algorithms, and the like. In addition, requirements in security policies are different. For example, a protection key length in a security policy 1 is required to be 256 bits, but a protection key length in a security policy 2 is required to be 128 bits. In this case, the first device may use different key derivation algorithms to satisfy requirements of different security policies on different protection key lengths (for example, using HMAC-SHA1 to generate a 128-bit protection key, and using HMAC-SHA256 to generate a 256-bit protection key). In addition, the KMS may use only one algorithm to generate a key and then generate a key of another length in another manner such as truncating (truncate) or prolonging. Processing the key length by the first device includes but is not limited to the foregoing processing manners.

It may be understood that, the intermediate key may be obtained by performing a derivation or a plurality of derivations based on the base keys, and the at least one key may also be obtained by performing a derivation or a plurality of derivations based on the intermediate key.

750. A KMS derives an intermediate key based on base keys.

In this embodiment of the present disclosure, the KMS derives the intermediate key based on the first parameter and the base keys. For details, refer to step 740. Details are not described again herein.

760. The KMS sends the intermediate key to the second device. Correspondingly, the second device receives the intermediate key sent by the AUSF.

770. The second device derives at least one key based on the intermediate key.

In this embodiment of the present disclosure, the second device derives the at least one key based on the second parameter and the intermediate key. For details, refer to step 740. Details are not described again herein.

It should be noted that, in the foregoing embodiment, mainly an example in which the first device and the second device derive the at least one key is used for description, in addition, the at least one key may be further derived by a network element such as the MM, the KMS, the SM, an Authentication, Authorization, and Accounting (AAA) network element, or a policy control network element. This is not limited in this application.

It is also possible that the second device sends a request to the KMS, where the request includes an air interface protection security policy, and where the KMS derives an encryption key and an integrity protection key and then sends the keys to the second device.

The following describes several main implementations of determining a session identifier of a session by a second device according to an embodiment of the present disclosure.

When the second device is a user plane node, the manners of determining the session identifier of the session by the second device include the following several manners.

In a first implementation, the second device determines the session identifier of the session based on an encapsulation header in which the protected data is located. Because a mapping relationship exists between an identifier in the encapsulation header and the session identifier, the second device may determine the session identifier based on the identifier in the encapsulation header. The identifier in the encapsulation header includes at least one of a QoS identifier, a tunnel identifier, or a MAC identifier. For example, if the encapsulation header is in a General Packet Radio Service (GPRS) Tunneling Protocol (GTP) encapsulation format, as shown in FIG. 8, the encapsulation header includes a version, a protocol, a reserved bit, an extension header flag, a sequence number flag, a non-PDU number flag, a message type, a message length, a tunnel identifier, a sequence number, a non-PDU number, and a next extension header type. The second device may determine the session identifier based on the tunnel identifier in the encapsulation header.

Figures 9, 10:
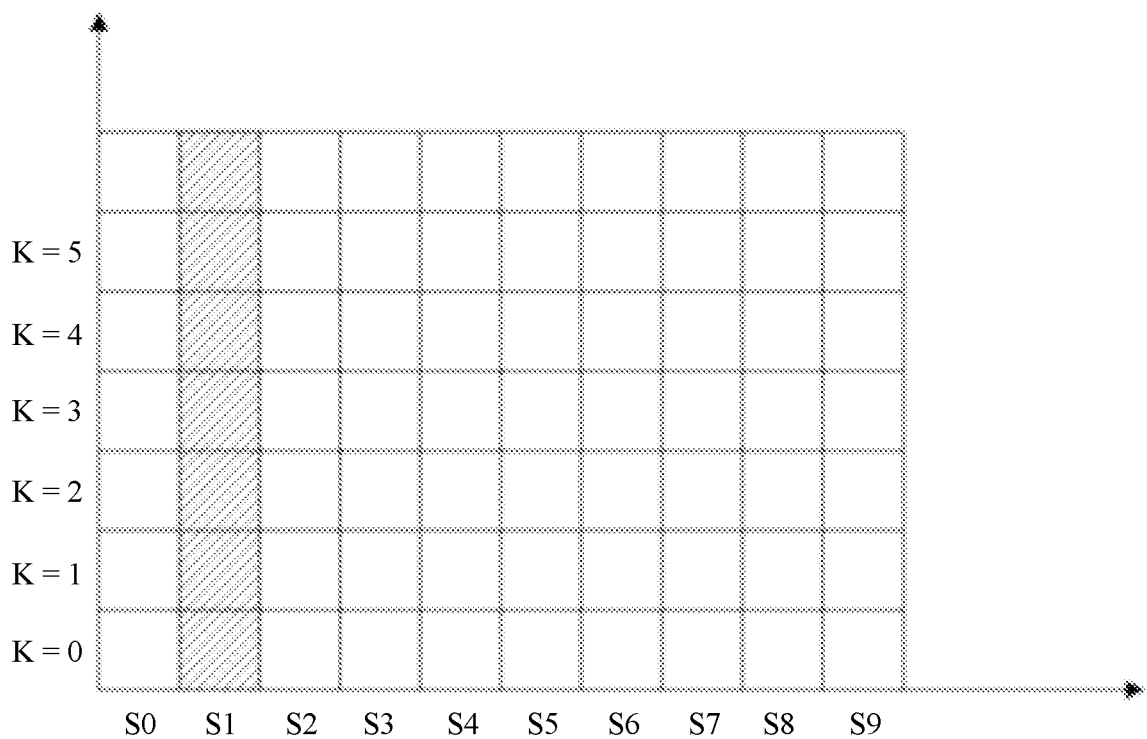
FIG. 9 is a schematic diagram of an outer IP header according to an embodiment of the present disclosure.
FIG. 10 is a schematic diagram of an air interface resource occupied by a session according to an embodiment of the present disclosure.

In a second implementation, the second device determines the session identifier of the session based on an outer IP header in which the protected data is located. As shown in FIG. 9, the outer IP header includes a version, a packet length, a type of service, a total length, an identifier, a flag, a segment offset, a lifetime, a protocol, a header checksum, a source address, a destination address, options, and data. A mapping relationship exists between the source address and/or the destination address and the session identifier. Additionally, the session identifier of the session may be determined based on the source address and/or the destination address in the outer IP header.

In a third implementation, the second device determines the session identifier of the session based on an identifier in an encapsulation header in which the protected data is located and a source address and/or a destination address in an outer IP header in which the protected data is located.

In a fourth implementation, the second device determines the session identifier of the session based on an identifier in a protocol data unit header in which the protected data is located and/or an identifier in an encapsulation header in which the protected data is located. The identifier in the protocol data unit header may be at least one of an IP address, a MAC address, or other identifiers. A mapping relationship exists between the identifier in the protocol data unit header and the session identifier, or a mapping relationship exists between the identifier in the encapsulation header and the session identifier of the session, or a mapping relationship exists between a combination of the identifier in the protocol data unit header and the identifier in the encapsulation header and the session identifier. Therefore, the session identifier may be determined based on the protocol data unit header and the encapsulation header. It should be noted that, a format of the protocol data unit header is similar to that of the outer IP header. For details, refer to FIG. 9 and related descriptions.

A mapping method includes but is not limited to the following manner. The second device inputs the identifier in the protocol data unit header to a filter, and the filter outputs the session identifier. The filter can represent the mapping relationship between the identifier in the protocol data unit header and the session identifier. To be more specific, when the identifier in the protocol data unit header is input to the filter, the filter outputs the session identifier.

In a fifth implementation, the second device determines the session identifier of the session based on a parameter field in the protected data. FIG. 3A or FIG. 3B shows a parameter field. In an implementation, the session identifier may be determined based on content of a second identifier field in the parameter field. For example, if the second identifier field in the parameter field is the session identifier, the second device may directly obtain the session identifier. If the second identifier field in the parameter field is at least one of a service identifier, a bearer identifier, a flow identifier, or a slice identifier, the session identifier may be obtained based on mapping relationships between the service identifier, the bearer identifier, the flow identifier, and the slice identifier, and the session identifier.

When the second device is an access network node, the manners of determining the session identifier of the session by the second device include the following several manners.

In a first implementation, the second device determines the session identifier of the session based on an air interface resource occupied by the session. FIG. 10 shows an air interface resource occupied by a session. In an implementation, the session identifier of the session may be determined by distinguishing the air interface resource occupied by the session. For example, as shown in FIG. 10, a session occupies an air interface resource whose timeslot is Si (a shadow part in the figure), and a session identifier of the session may be determined based on the air interface resource Si occupied by the session. This example is merely used to explain this embodiment of the present disclosure, and shall not be construed as a limitation.

Figure 11:
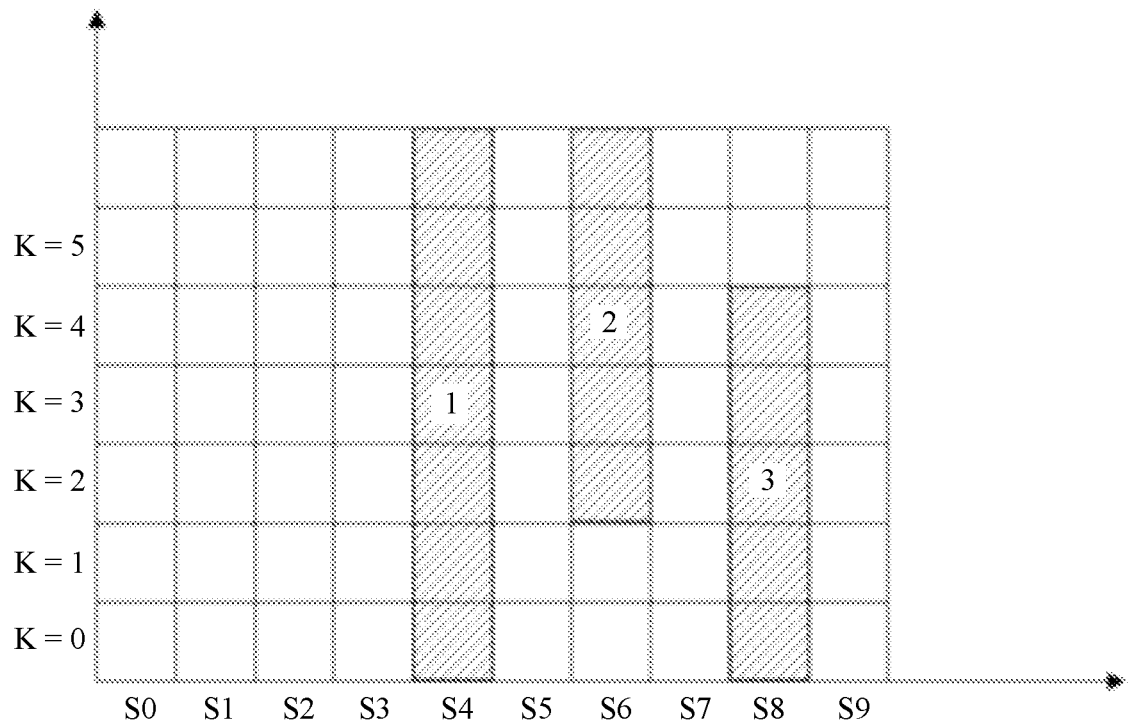
FIG. 11 is a schematic diagram of a radio bearer occupied by a session according to an embodiment of the present disclosure.

In a second implementation, the second device determines the session identifier of the session based on an air interface identifier of an air interface occupied by the session. The air interface identifier may be an identifier such as an air interface bearer identifier (such as a signaling bearer identifier or a data bearer identifier), an air interface resource identifier, or a cell radio network temporary identifier, such as a Cell Radio Network Temporary Identify (CRNTI). Because a mapping relationship exists between the air interface identifier and the session identifier, the session identifier may be determined based on the mapping relationship between the air interface identifier and the session identifier. FIG. 11 shows a possibility of a data radio bearer occupied by a session, where a session identifier of the session may be determined by distinguishing an identifier of the data radio bearer occupied by the session. As shown in FIG. 11, the session occupies resources shown by shadow areas "1", "2", and "3" for establishing a data radio bearer, and the session identifier of the session may be determined based on an identifier of the radio bearer occupied by the session. This example is merely used to explain this embodiment of the present disclosure, and shall not be construed as a limitation.

In a third implementation, the second device determines the session identifier of the session based on a parameter field in the protected data. FIG. 3A or FIG. 3B shows a parameter field. In an implementation, the session identifier may be determined based on content of a second identifier field in the parameter field. For example, if the second identifier field in the parameter field is the session identifier, the second device may directly obtain the session identifier. If the second identifier field in the parameter field is at least one of a service identifier, a bearer identifier, a flow identifier, or a slice identifier, the session identifier may be obtained based on mapping relationships between the service identifier, the bearer identifier, the flow identifier, and the slice identifier, and the session identifier.

The foregoing describes in detail the methods in the embodiments of the present disclosure. The following provides apparatuses in the embodiments of the present disclosure.

Figure 12:
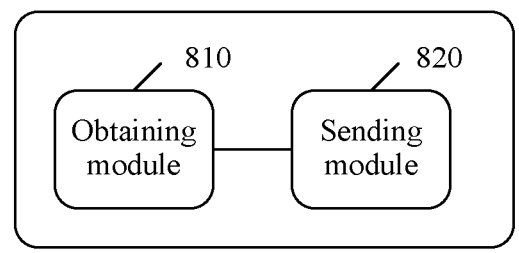
FIG. 12 is a schematic structural diagram of a first device according to an embodiment of the present disclosure.

FIG. 12 is a schematic structural diagram of a first device according to an embodiment of the present disclosure. The first device may include an obtaining module 810 and a sending module 820, where detailed descriptions about the units are as follows.

The obtaining module 810 is configured to obtain a security policy of a session and at least one key.

The sending module 820 is configured to send protected data to a second device, where the protected data is obtained by protecting security of session data of the session using the at least one key based on the security policy of the session, and where the second device is configured to restore the protected data using the at least one key based on the security policy to obtain the session data.

When the first device is a terminal device, the second device is an access network node or a user plane node. Alternatively, when the first device is an access network node or a user plane node, the second device is a terminal device.

Optionally, the at least one key includes a first key and a second key, where the first key is used to protect first security of the session, and where the second key is used to protect second security of the session.

Optionally, the security policy is used to indicate a protection mode of the session data, and the protection mode includes: protecting the first security of the session data using the first key based on a first security algorithm; or protecting the second security of the session data using the second key based on a second security algorithm; or protecting the first security of the session data using the first key based on the first security algorithm and protecting the second security of the session data using the second key based on the second security algorithm.

Optionally, the security policy is further used to indicate at least one of the first security algorithm, the second security algorithm, a key length, or a key update time.

Optionally, the key length includes a first key length and/or a second key length, where the first key length is used to represent a length of the first key, and where the second key length is used to represent a length of the second key.

Optionally, the key update time includes a first key update time and/or a second key update time, where the first key update time is used to represent an update time of the first key, and where the second key update time is used to represent an update time of the second key.

Optionally, the first security is confidentiality, and the second security is integrity.

Optionally, the protected data further includes a parameter field, and the parameter field includes at least one of a first identifier field, a second identifier field, or a third identifier field, where the first identifier field is used to indicate that a current message is a session message, where the second identifier field is used to indicate at least one of a service identifier, a session identifier, a bearer identifier, a flow identifier, or a slice identifier, and where the third identifier is used to indicate the protection mode of the session.

Optionally, the parameter field further includes at least one of a length field, a packet field, or a MAC field, where the length field is used to indicate a length of the parameter field, where the packet field is used to indicate a length of a packet when the packet is encrypted, and where the MAC field is used to indicate that integrity of the session is protected.

Optionally, the obtaining module 810 is configured to obtain the security policy from a policy controller.

Figure 13:
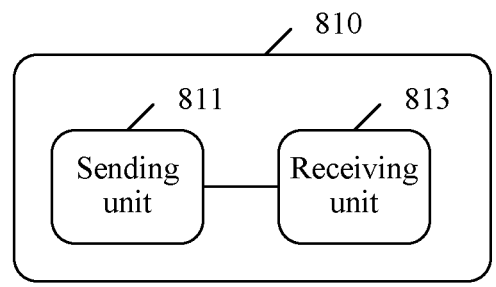
FIG. 13 is a first schematic structural diagram of an obtaining module of a first device according to an embodiment of the present disclosure.

Optionally, as shown in FIG. 13, the obtaining module 810 includes a sending unit 811 and a receiving unit 813, where the sending unit 811 is configured to send a first request to the access network node, where the first request includes a security capability of the first device and a service security requirement, and where the receiving unit 813 is configured to receive the security policy returned by the access network node. The security policy is obtained by the access network node by sending a second request to the policy controller, and the second request is generated by the access network node based on the first request and includes the security capability of the first device, the service security requirement, and a security requirement of the access network node.

Optionally, the sending unit 811 is configured to send a first request to the access network node, where the first request includes a security capability of the first device and a service security requirement of the first device, and where the receiving unit 813 is configured to receive the security policy returned by the access network node. The security policy is obtained by the access network node by forwarding a second request to the policy controller through at least one network element, and the second request is generated by the access network node based on the first request and includes the security capability of the first device, the service security requirement, and a security requirement of the access network node.

Optionally, the at least one network element includes a session management network element. Alternatively, or the at least one network element includes a session management network element or a mobility management entity.

Optionally, the sending unit 811 is configured to send a first request to the access network node, where the first request includes a security capability of the first device and a service security requirement, and where the receiving unit 813 is configured to receive the security policy returned by the access network node. The security policy is generated by the access network node based on a core network security policy and a security capability of the access network node, and the core network security policy is generated by the policy controller based on the first request forwarded by the access network node.

Figure 14:
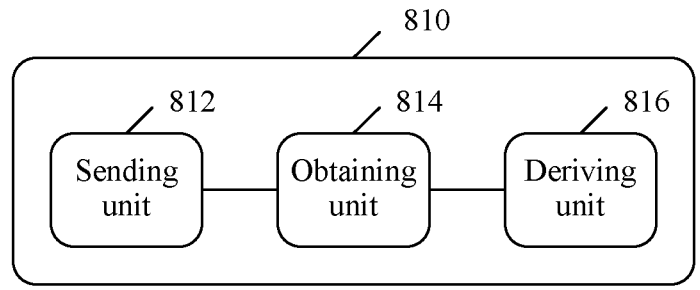
FIG. 14 is a second schematic structural diagram of an obtaining module of a first device according to an embodiment of the present disclosure.

Optionally, as shown in FIG. 14, when the second device is the access network node, the obtaining module 810 includes a sending unit 812, an obtaining unit 814, and a deriving unit 816, where the sending unit 812 is configured to send a third request to an authentication node through the access network node, where the obtaining unit 814 is configured to obtain base keys based on the third request, where the base keys are generated after the first device and the authentication node authenticate each other, and where the deriving unit 816 is configured to derive the at least one key based on the base keys.

Optionally, the deriving unit 816 is configured to derive an intermediate key based on the base keys, and derive the at least one key based on the intermediate key.

Optionally, the deriving unit 816 is configured to derive the intermediate key based on a first parameter and the base keys, where the first parameter includes at least one of an identifier of the access network node, an NAS counter, a sequence number for generating the intermediate key, a sequence number of a packet, a nonce 1, the bearer identifier, the flow identifier, or the slice identifier.

Optionally, the deriving unit 816 is configured to derive the at least one key based on the second parameter and the intermediate key, where the second parameter includes at least one of an air interface security policy identifier, a security algorithm identifier, an NAS counter, a nonce 2, an air interface resource identifier, an air interface bearer identifier, the slice identifier, or the session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

Optionally, the at least one key includes at least one of an air interface signaling encryption key, an air interface signaling integrity encryption key, a user plane key, or a user plane integrity encryption key.

Optionally, the protected data is header data, payload data, or a packet, where the packet includes the header data and the payload data.

It should be noted that, for an implementation of each unit, correspondingly, reference may be further made to corresponding descriptions about the method embodiment shown in FIG. 2.

Figure 15:
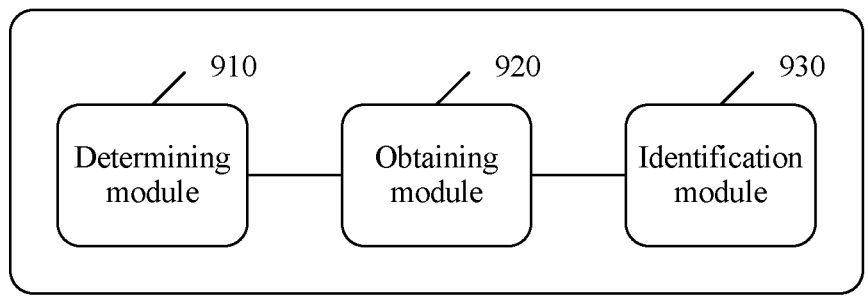
FIG. 15 is a schematic structural diagram of a second device according to an embodiment of the present disclosure.

FIG. 15 is a schematic structural diagram of a second device according to an embodiment of the present disclosure. The second device may include a determining module 910, an obtaining module 920, and an identification module 930, where detailed descriptions about the units are as follows.

The determining module 910 is configured to determine a session identifier of a session.

The obtaining module 920 is configured to obtain a security policy of the session and at least one key.

The identification module 930 is configured to: identify, based on the session identifier, protected data that is of the session and is sent by a first device; and restore the protected data using the at least one key based on the security policy of the session to obtain session data, where the protected data is obtained by the first device by protecting security of the session data using the at least one key based on the security policy of the session, and where the first device is configured to encrypt the session data using the at least one key based on the security policy to obtain the protected data.

When the first device is a terminal device, the second device is an access network node or a user plane node. Alternatively, when the first device is an access network node or a user plane node, the second device is a terminal device.

Optionally, the at least one key includes a first key and a second key, where the first key is used to protect first security of the session, and where the second key is used to protect second security of the session.

Optionally, the security policy is used to indicate a protection mode of the session data, and the protection mode includes: protecting the first security of the session data using the first key based on a first security algorithm; or protecting the second security of the session data using the second key based on a second security algorithm; or protecting the first security of the session data using the first key based on the first security algorithm and protecting the second security of the session data using the second key based on the second security algorithm.

Optionally, the security policy is further used to indicate at least one of the first security algorithm, the second security algorithm, a key length, or a key update time.

Optionally, the key length includes a first key length and/or a second key length, where the first key length is used to represent a length of the first key, and where the second key length is used to represent a length of the second key.

Optionally, the key update time includes a first key update time and/or a second key update time, where the first key update time is used to represent an update time of the first key, and where the second key update time is used to represent an update time of the second key.

Optionally, when the second device is the user plane node, the determining module 910 is configured to: determine the session identifier of the session based on an encapsulation header in which the protected data is located; or determine the session identifier of the session based on a tunnel identifier in an encapsulation header in which the protected data is located; or determine the session identifier of the session based on an outer IP packet header in which the protected data is located; or determine the session identifier of the session based on an encapsulation header in which the protected data is located and an outer IP packet header in which the protected data is located; or determine the session identifier of the session based on a protocol data unit header in which the protected data is located and an encapsulation header in which the protected data is located; or determine the session identifier of the session based on a parameter field in the protected data.

Optionally, when the second device is the access network node, the determining module 910 is configured to: determine the session identifier of the session based on an air interface resource occupied by the session; or determine the session identifier of the session based on an air interface identifier of an air interface occupied by the session; or determine the session identifier of the session based on an identifier of a data radio bearer occupied by the session; or determine the session identifier of the session based on a parameter field in the protected data.

Optionally, the first security is confidentiality, and the second security is integrity.

Optionally, the parameter field includes at least one of a first identifier field, a second identifier field, or a third identifier field, where the first identifier field is used to indicate that a current message is a session message, where the second identifier field is used to indicate at least one of a service identifier, the session identifier, or a slice identifier, and where the third identifier is used to indicate the protection mode of the session.

Optionally, the parameter field further includes at least one of a length field, a packet field, or a MAC field, where the length field is used to indicate a length of the parameter field, where the packet field is used to indicate a length of a packet when the packet is encrypted, and where the MAC field is used to indicate that integrity of the session is protected.

Optionally, when the second device is the access network node, the obtaining module 920 is configured to obtain the security policy from a first network element, where the first network element is any one of an authentication controller, a key management controller, a policy controller, or a key controller.

Figure 16:
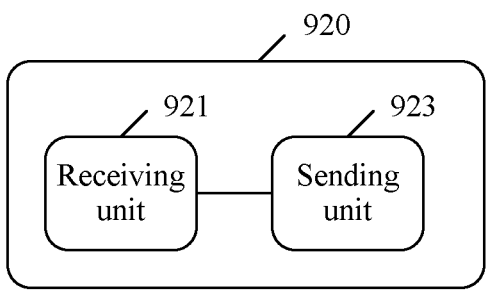
FIG. 16 is a first schematic structural diagram of an obtaining module of a second device according to an embodiment of the present disclosure.

Optionally, as shown in FIG. 16, when the first network element is the policy controller, the obtaining module 920 includes a receiving unit 921 and a sending unit 923, where the receiving unit 921 is configured to receive a first request sent by the first device, where the first request includes a security capability of the first device and a service security requirement of the first device, and where the sending unit 923 is configured to send a second request to the policy controller. The second request is generated based on the first request and includes the security capability of the first device, the service security requirement, and a security requirement of the access network node, and the receiving unit 921 is configured to receive the security policy returned by the policy controller, where the security policy is generated by the policy controller based on the second request.

Optionally, the receiving unit 921 is configured to receive a first request sent by the first device, where the first request includes a security capability of the first device and a service security requirement, where the sending unit 923 is configured to send a second request to the policy controller through at least one network element, and where the second request is generated based on the first request and includes the security capability of the first device, the service security requirement, and a security requirement of the access network node. The receiving unit 921 is configured to receive the security policy returned by the policy controller through the at least one network element, where the security policy is generated by the policy controller based on the second request.

Optionally, the at least one network element includes a session management network element. Alternatively, the at least one network element includes a session management network element or a mobility management entity.

Optionally, the receiving unit 921 is configured to receive a first request sent by the first device, where the first request includes a security capability of the first device and a service security requirement, and where the sending unit 923 is configured to forward the first request to the policy controller. The receiving unit 921 is further configured to: receive a core network security policy returned by the policy controller; and generate the security policy based on the core network security policy and a security capability of the access network node.

Figure 17:
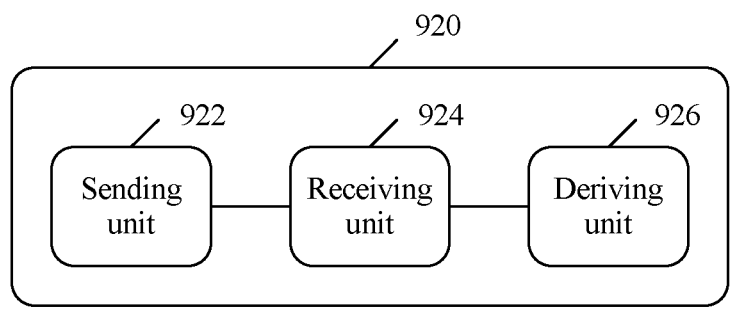
FIG. 17 is a second schematic structural diagram of an obtaining module of a second device according to an embodiment of the present disclosure.

Optionally, as shown in FIG. 17, when the second device is the access network node, the obtaining module 920 includes a sending unit 922, a receiving unit 924, and a deriving unit 926, where the sending unit 922 is configured to send a third request to a key management center, where the receiving unit 924 is configured to receive an intermediate key returned by the key management center based on the third request, where the intermediate key is derived based on base keys that are sent by an authentication node to the key management center, and where the deriving unit 926 is configured to derive the at least one key based on the intermediate key.

Optionally, the intermediate key is derived based on a first parameter, where the first parameter includes at least one of an identifier of the access network node, an NAS counter, a sequence number for generating the intermediate key, a sequence number of a packet, a nonce 1, a bearer identifier, a flow identifier, or the slice identifier.

Optionally, the deriving unit 923 is configured to derive the at least one key based on the second parameter and the intermediate key, where the second parameter includes at least one of an air interface security policy identifier, a security algorithm identifier, an NAS counter, a nonce 2, an air interface resource identifier, an air interface bearer identifier, the slice identifier, or the session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

Optionally, the at least one key includes at least one of an air interface signaling encryption key, an air interface signaling integrity encryption key, a user plane key, or a user plane integrity encryption key.

Optionally, when the second device is the user plane node, the obtaining module 920 is configured to request the at least one key from the first network element, where the first network element is any one of the authentication controller, the key management controller, the policy controller, or the key controller.

Optionally, the protected data is header data, payload data, or a packet, where the packet includes the header data and the payload data.

It should be noted that, for an implementation of each unit, correspondingly, reference may be further made to corresponding descriptions about the method embodiment shown in FIG. 2.

Figure 18:
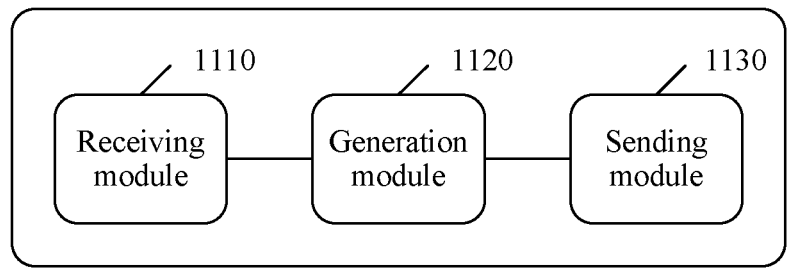
FIG. 18 is a schematic structural diagram of a policy controller according to an embodiment of the present disclosure.

FIG. 18 is a schematic structural diagram of a policy controller according to an embodiment of the present disclosure. The policy controller may include a receiving module 1110, a generation module 1120, and a sending module 1130, where detailed descriptions about the units are as follows:

The receiving module 1110 is configured to receive a policy request sent by a target network element, where the policy request includes at least one of a security capability, a service security requirement of a terminal device, or a security requirement of an access network node.

The generation module 1120 is configured to generate a security policy based on a target parameter, where the target parameter is generated based on the first request and includes at least one of the security capability of the terminal device, the service security requirement, or the security requirement of the access network node.

The sending module 1130 is configured to send the security policy to the access network node.

Optionally, the target parameter further includes a preset security capability of the terminal device, where the preset security capability of the terminal device is obtained from an authentication service controller or AUSF.

Optionally, the target parameter further includes a security requirement of a server, where the security requirement of the server is obtained from the server.

Optionally, the target network element is the access network node or a session management network element.

It should be noted that, for an implementation of each unit, correspondingly, reference may be further made to corresponding descriptions about the method embodiment shown in FIG. 2.

Figure 19:
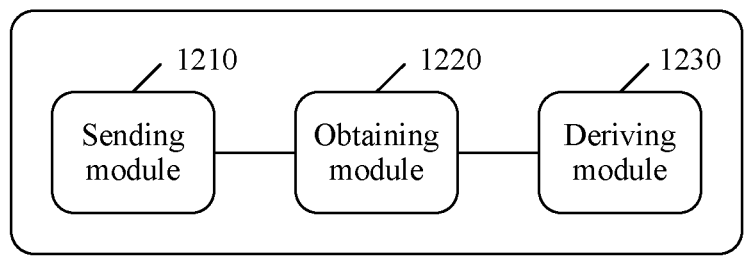
FIG. 19 is a schematic structural diagram of a first device according to an embodiment of the present disclosure.

FIG. 19 is a schematic structural diagram of a first device according to an embodiment of the present disclosure. The first device may include a sending module 1210, an obtaining module 1220, and a deriving module 1230.

The sending module 1210 is configured to send a third request to an authentication node through the access network node.

The obtaining module 1220 is configured to obtain base keys based on the third request, where the base keys are generated after the first device and the authentication node authenticate each other.

The deriving module 1230 is configured to derive the at least one key based on the base keys.

Optionally, the deriving module 1230 is configured to derive an intermediate key based on the base keys, and derive the at least one key based on the intermediate key.

Optionally, the deriving module 1230 is configured to derive the intermediate key based on a first parameter and the base keys, where the first parameter includes at least one of an identifier of the access network node, an NAS counter, a sequence number for generating the intermediate key, a sequence number of a packet, a nonce 1, a bearer identifier, a flow identifier, or a slice identifier.

Optionally, the deriving module 1230 is configured to derive the at least one key based on the second parameter and the intermediate key, where the second parameter includes at least one of an air interface security policy identifier, a security algorithm identifier, an NAS counter, a nonce 2, an air interface resource identifier, an air interface bearer identifier, a slice identifier, or a session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

Optionally, the at least one key includes at least one of an air interface signaling encryption key, an air interface signaling integrity encryption key, a user plane key, or a user plane integrity encryption key.

It should be noted that, for an implementation of each unit, correspondingly, reference may be further made to corresponding descriptions about the method embodiment shown in FIG. 2.

Figure 20:
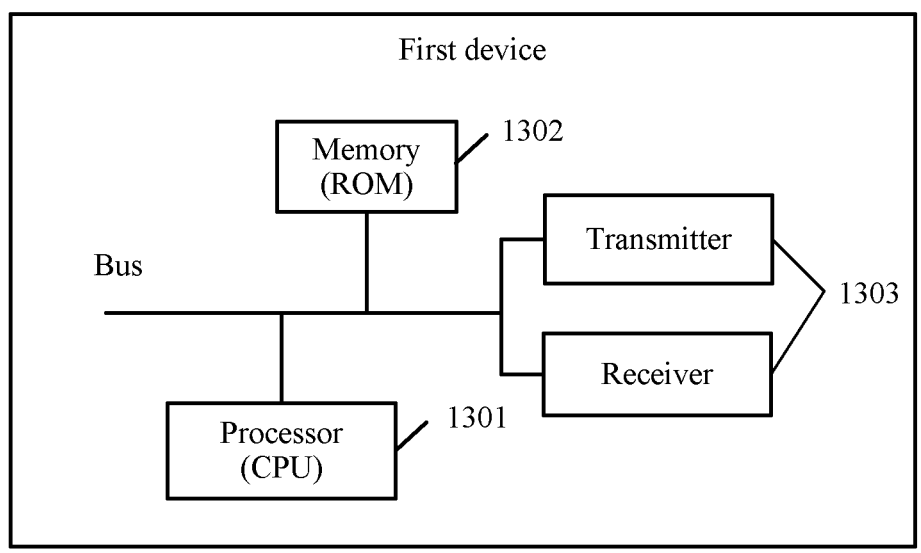
FIG. 20 is a schematic structural diagram of a first device according to an embodiment of the present disclosure.

FIG. 20 is a first device according to an embodiment of the present disclosure. The first device includes a processor 1301, a memory 1302, and a transceiver 1303. The processor 1301, the memory 1302, and the transceiver 1303 are interconnected by a bus.

The memory 1302 includes but is not limited to a random-access memory (RAM), a read-only memory (ROM), an erasable programmable read only memory (EPROM), or a compact disc read-only memory (CD-ROM), and the memory 1302 is configured to store a related instruction and data. The transceiver 1303 is configured to receive and send data.

The processor 1301 may be one or more central processing units (CPUs). When the processor 1301 is one CPU, the CPU may be a single-core CPU, or may be a multi-core CPU.

The processor 1301 in the first device is configured to read program code stored in the memory 1302 to perform the following operations.

The processor 1301 obtains a security policy of a session and at least one key, and the transceiver 1303 sends protected data to a second device, where the protected data is obtained by protecting security of session data of the session using the at least one key based on the security policy of the session, and where the second device is configured to restore the protected data using the at least one key based on the security policy to obtain the session data. When the first device is a terminal device, the second device is an access network node or a user plane node. Alternatively, when the first device is an access network node or a user plane node, the second device is a terminal device.

Optionally, the at least one key includes a first key and a second key, where the first key is used to protect first security of the session, and where the second key is used to protect second security of the session.

Optionally, the security policy is used to indicate a protection mode of the session data, and the protection mode includes: protecting the first security of the session data using the first key based on a first security algorithm; or protecting the second security of the session data using the second key based on a second security algorithm; or protecting the first security of the session data using the first key based on the first security algorithm and protecting the second security of the session data using the second key based on the second security algorithm.

Optionally, the security policy is further used to indicate at least one of the first security algorithm, the second security algorithm, a key length, or a key update time.

Optionally, the key length includes a first key length and/or a second key length, where the first key length is used to represent a length of the first key, and where the second key length is used to represent a length of the second key.

Optionally, the key update time includes a first key update time and/or a second key update time, where the first key update time is used to represent an update time of the first key, and where the second key update time is used to represent an update time of the second key.

Optionally, the first security is confidentiality, and the second security is integrity.

Optionally, the protected data further includes a parameter field, and the parameter field includes at least one of a first identifier field, a second identifier field, or a third identifier field, where the first identifier field is used to indicate that a current message is a session message, where the second identifier field is used to indicate at least one of a service identifier, a session identifier, a bearer identifier, a flow identifier, or a slice identifier, and where the third identifier is used to indicate the protection mode of the session.

Optionally, the parameter field further includes at least one of a length field, a packet field, or a MAC field, where the length field is used to indicate a length of the parameter field, where the packet field is used to indicate a length of a packet when the packet is encrypted, and where the MAC field is used to indicate that integrity of the session is protected.

Optionally, the transceiver 1303 obtains the security policy from a policy controller.

Optionally, the transceiver 1303 sends a first request to the access network node, where the first request includes a security capability of the first device and a service security requirement, and where the transceiver 1303 receives the security policy returned by the access network node. The security policy is obtained by the access network node by sending a second request to the policy controller, and the second request is generated by the access network node based on the first request and includes the security capability of the first device, the service security requirement, and a security requirement of the access network node.

Optionally, the transceiver 1303 sends a first request to the access network node, where the first request includes a security capability of the first device and a service security requirement, and where the transceiver 1303 receives the security policy returned by the access network node. The security policy is obtained by the access network node by forwarding a second request to the policy controller through at least one network element, and the second request is generated by the access network node based on the first request and includes the security capability of the first device, the service security requirement, and a security requirement of the access network node.

Optionally, the at least one network element includes a session management network element. Alternatively, the at least one network element includes a session management network element or a mobility management entity.

Optionally, the transceiver 1303 sends a first request to the access network node, where the first request includes a security capability of the first device and a service security requirement, and optionally, the transceiver 1303 receives the security policy returned by the access network node. The security policy is generated by the access network node based on a core network security policy and a security capability of the access network node, and the core network security policy is generated by the policy controller based on the first request forwarded by the access network node.

Optionally, the transceiver 1303 sends a third request to an authentication node through the access network node, and the transceiver 1303 obtains base keys based on the third request, where the base keys are generated after the first device and the authentication node authenticate each other. The processor 1301 derives the at least one key based on the base keys.

Optionally, the processor 1301 derives an intermediate key based on the base keys, and derives the at least one key based on the intermediate key.

Optionally, the processor 1301 derives the intermediate key based on a first parameter and the base keys, where the first parameter includes at least one of an identifier of the access network node, an NAS counter, a sequence number for generating the intermediate key, a sequence number of a packet, a nonce 1, the bearer identifier, the flow identifier, or the slice identifier.

Optionally, the processor 1301 derives the at least one key based on the second parameter and the intermediate key, where the second parameter includes at least one of an air interface security policy identifier, a security algorithm identifier, an NAS counter, a nonce 2, an air interface resource identifier, an air interface bearer identifier, the slice identifier, or the session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

Optionally, the at least one key includes at least one of an air interface signaling encryption key, an air interface signaling integrity encryption key, a user plane key, or a user plane integrity encryption key.

Optionally, the protected data is header data, payload data, or a packet, where the packet includes the header data and the payload data.

Further, the processor 1301 in the first device may be configured to read program code stored in the memory 1302 to perform the following operations.

Optionally, the transceiver 1303 sends a third request to an authentication node through the access network node, the processor 1301 obtains base keys based on the third request, where the base keys are generated after the first device and the authentication node authenticate each other, and where the processor 1301 derives the at least one key based on the base keys.

Optionally, the processor 1301 derives an intermediate key based on the base keys, and derives the at least one key based on the intermediate key.

Optionally, the processor 1301 derives the intermediate key based on a first parameter and the base keys, where the first parameter includes at least one of an identifier of the access network node, an NAS counter, a sequence number for generating the intermediate key, a sequence number of a packet, a nonce 1, a bearer identifier, a flow identifier, or a slice identifier.

Optionally, the processor 1301 derives the at least one key based on the second parameter and the intermediate key, where the second parameter includes at least one of an air interface security policy identifier, a security algorithm identifier, an NAS counter, a nonce 2, an air interface resource identifier, an air interface bearer identifier, a slice identifier, or a session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

Optionally, the at least one key includes at least one of an air interface signaling encryption key, an air interface signaling integrity encryption key, a user plane key, or a user plane integrity encryption key.

It should be noted that, for an implementation of each operation, correspondingly, reference may be further made to corresponding descriptions about the method embodiment shown in FIG. 2.

Figure 21:
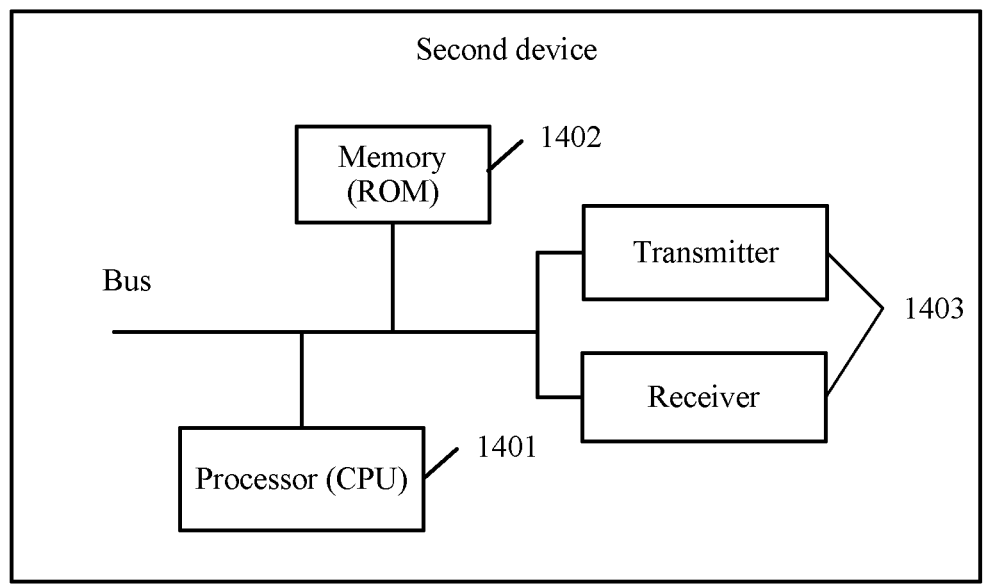
FIG. 21 is a schematic structural diagram of a second device according to an embodiment of the present disclosure.

FIG. 21 is a second device according to an embodiment of the present disclosure. The second device includes a processor 1401, a memory 1402, and a transceiver 1403. The processor 1401, the memory 1402, and the transceiver 1403 are interconnected by a bus.

The memory 1402 includes but is not limited to a RAM, a ROM, an EPROM, or a CD-ROM, and the memory 1402 is configured to store a related instruction and data. The transceiver 1403 is configured to receive and send data.

The processor 1401 may be one or more central processing units (CPUs). When the processor 1401 is one CPU, the CPU may be a single-core CPU, or may be a multi-core CPU.

The processor 1401 in the second device is configured to read program code stored in the memory 1402 to perform the following operations.

The processor 1401 determines a session identifier of a session, the processor 1401 obtains a security policy of the session and at least one key, the processor 1401 identifies, based on the session identifier, protected data that is of the session and is sent by a first device, and the processor 1401 restores the protected data using the at least one key based on the security policy of the session to obtain session data. The protected data is obtained by the first device by protecting security of the session data using the at least one key based on the security policy of the session, and the first device is configured to encrypt the session data using the at least one key based on the security policy to obtain protected data. When the first device is a terminal device, the second device is an access network node or a user plane node. Alternatively, when the first device is an access network node or a user plane node, the second device is a terminal device.

Optionally, the at least one key includes a first key and a second key, where the first key is used to protect first security of the session, and where the second key is used to protect second security of the session.

Optionally, the security policy is used to indicate a protection mode of the session data, and the protection mode includes: protecting the first security of the session data using the first key based on a first security algorithm; or protecting the second security of the session data using the second key based on a second security algorithm; or protecting the first security of the session data using the first key based on the first security algorithm and protecting the second security of the session data using the second key based on the second security algorithm.

Optionally, the security policy is further used to indicate at least one of the first security algorithm, the second security algorithm, a key length, or a key update time.

Optionally, the key length includes a first key length and/or a second key length, where the first key length is used to represent a length of the first key, and where the second key length is used to represent a length of the second key.

Optionally, the key update time includes a first key update time and/or a second key update time, where the first key update time is used to represent an update time of the first key, and where the second key update time is used to represent an update time of the second key.

Optionally, when the second device is the user plane node, the processor 1401 is configured to: determine the session identifier of the session based on an encapsulation header in which the protected data is located; or determine the session identifier of the session based on a tunnel identifier in an encapsulation header in which the protected data is located; or determine the session identifier of the session based on an outer IP packet header in which the protected data is located; or determine the session identifier of the session based on an encapsulation header in which the protected data is located and an outer IP packet header in which the protected data is located; or determine the session identifier of the session based on a protocol data unit header in which the protected data is located and an encapsulation header in which the protected data is located; or determine the session identifier of the session based on a parameter field in the protected data.

Optionally, when the second device is the access network node, the processor 1401 is configured to: determine the session identifier of the session based on an air interface resource occupied by the session; or determine the session identifier of the session based on an air interface identifier of an air interface occupied by the session; or determine the session identifier of the session based on an identifier of a data radio bearer occupied by the session; or determine the session identifier of the session based on a parameter field in the protected data.

Optionally, the first security is confidentiality, and the second security is integrity.

Optionally, the parameter field includes at least one of a first identifier field, a second identifier field, or a third identifier field, where the first identifier field is used to indicate that a current message is a session message, where the second identifier field is used to indicate at least one of a service identifier, the session identifier, or a slice identifier, and where the third identifier is used to indicate the protection mode of the session.

Optionally, the parameter field further includes at least one of a length field, a packet field, or a MAC field, where the length field is used to indicate a length of the parameter field, where the packet field is used to indicate a length of a packet when the packet is encrypted, and where the MAC field is used to indicate that integrity of the session is protected.

Optionally, the transceiver 1403 obtains the security policy from a first network element, where the first network element is any one of an authentication controller, a key management controller, a policy controller, or a key controller.

Optionally, when the first network element is the policy controller, the transceiver 1403 receives a first request sent by the first device, where the first request includes a security capability of the first device and a service security requirement of the first device, and where the transceiver 1403 sends a second request to the policy controller. The second request is generated based on the first request and includes the security capability of the first device, the service security requirement, and a security requirement of the access network node, and the transceiver 1403 receives the security policy returned by the policy controller, where the security policy is generated by the policy controller based on the second request.

Optionally, when the first network element is the policy controller, the transceiver 1403 receives a first request sent by the first device, where the first request includes a security capability of the first device and a service security requirement of the first device, and where the transceiver 1403 sends a second request to the policy controller through at least one network element. The second request is generated based on the first request and includes the security capability of the first device, the service security requirement, and a security requirement of the access network node, and the transceiver 1403 receives the security policy returned by the policy controller through the at least one network element, where the security policy is generated by the policy controller based on the second request.

Optionally, the at least one network element includes a session management network element. Alternatively, the at least one network element includes a session management network element or a mobility management entity.

Optionally, the transceiver 1403 receives a first request sent by the first device, where the first request includes a security capability of the first device and a service security requirement of the first device. The transceiver 1403 forwards the first request to the policy controller, the transceiver 1403 receives a core network security policy returned by the policy controller, and the transceiver 1403 generates the security policy based on the core network security policy and a security capability of the access network node.

Optionally, when the second device is the access network node, the transceiver 1403 sends a third request to a key management center, the transceiver 1403 receives an intermediate key returned by the key management center based on the third request, where the intermediate key is derived based on base keys that are sent by an authentication node to the key management center, and where the processor 1401 derives the at least one key based on the intermediate key.

Optionally, the intermediate key is derived based on a first parameter, where the first parameter includes at least one of an identifier of the access network node, an NAS counter, a sequence number for generating the intermediate key, a sequence number of a packet, a nonce 1, a bearer identifier, a flow identifier, or the slice identifier.

Optionally, the processor 1401 derives the at least one key based on the second parameter and the intermediate key, where the second parameter includes at least one of an air interface security policy identifier, a security algorithm identifier, an NAS counter, a nonce 2, an air interface resource identifier, an air interface bearer identifier, the slice identifier, or the session identifier, and where the security algorithm identifier is at least one of an air interface signaling encryption algorithm identifier, an air interface information integrity protection algorithm identifier, a user plane encryption algorithm identifier, or a user plane integrity protection algorithm identifier.

Optionally, the at least one key includes at least one of an air interface signaling encryption key, an air interface signaling integrity encryption key, a user plane key, or a user plane integrity encryption key.

Optionally, when the second device is the user plane node, the transceiver 1403 requests the at least one key from the first network element, where the first network element is any one of the authentication controller, the key management controller, the policy controller, or the key controller.

Optionally, the protected data is header data, payload data, or a packet, where the packet includes the header data and the payload data.

It should be noted that, for an implementation of each operation, correspondingly, reference may be further made to corresponding descriptions about the method embodiment shown in FIG. 2.

Figure 22:
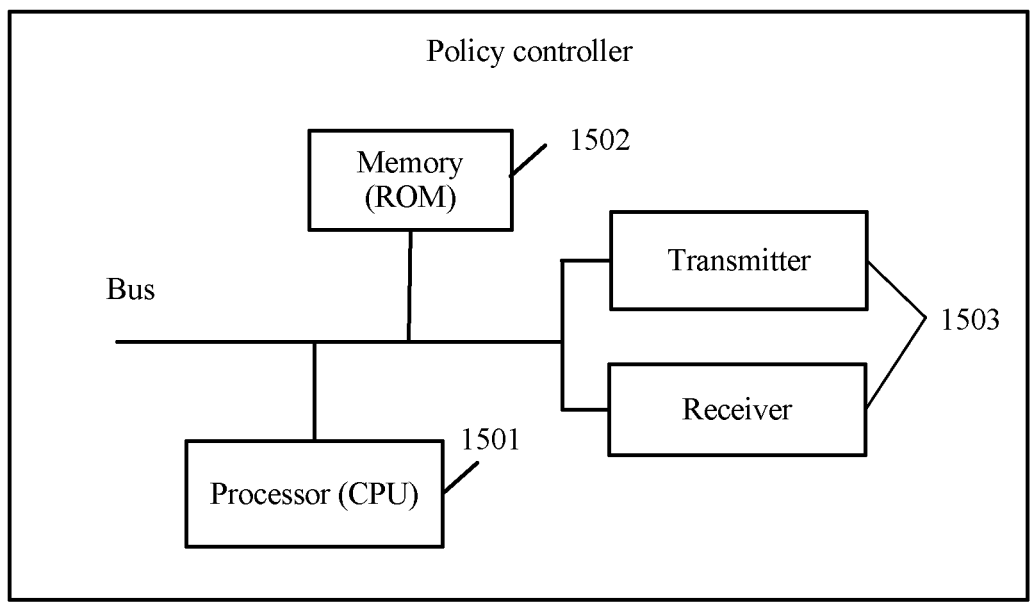
FIG. 22 is a schematic structural diagram of a policy controller according to an embodiment of the present disclosure.

FIG. 22 is a policy controller according to an embodiment of the present disclosure. The policy controller includes a processor 1501, a memory 1502, and a transceiver 1503. The processor 1501, the memory 1502, and the transceiver 1503 are interconnected by a bus.

The memory 1502 includes but is not limited to a RAM, a ROM, an EPROM, or a CD-ROM, and the memory 1502 is configured to store a related instruction and data. The transceiver 1503 is configured to receive and send data.

The processor 1501 may be one or more CPUs. When the processor 1501 is one CPU, the CPU may be a single-core CPU, or may be a multi-core CPU.

The processor 1501 in the first device is configured to read program code stored in the memory 1502 to perform the following operations. The transceiver 1503 receives a policy request sent by a target network element, where the policy request includes at least one of a security capability, a service security requirement of a terminal device, or a security requirement of an access network node. The processor 1501 generates a security policy based on a target parameter, where the target parameter is generated based on the first request and includes at least one of the security capability of the terminal device, the service security requirement, or the security requirement of the access network node, and where the transceiver 1503 sends the security policy to the access network node.

Optionally, the target parameter further includes a preset security capability of the terminal device, where the preset security capability of the terminal device is obtained from an authentication service controller or AUSF.

Optionally, the target parameter further includes a security requirement of a server, where the security requirement of the server is obtained from the server.

Optionally, the target network element is the access network node or a session management network element.

It should be noted that, for an implementation of each operation, correspondingly, reference may be further made to corresponding descriptions about the method embodiment shown in FIG. 2.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes any medium that can store program code, such as a ROM, a RAM, a magnetic disk, or an optical disc.

What is claimed is:

1. A security implementation method implemented by an apparatus and comprising:
    obtaining a security policy of a session between the apparatus and an access network node, wherein the security policy indicates a protection mode of the session;
    obtaining at least one key, wherein the at least one key comprises a first key or a second key, wherein the first key is based on a user plane encryption algorithm identifier, and wherein the second key is based on a user plane integrity protection algorithm identifier;
    performing, based on the protection mode, security protection on session data of the session using the at least one key to obtain protected data of the session, wherein performing the security protection comprises protecting first security of the session data using the first key or protecting second security of the session data using the second key, wherein protecting the first security of the session includes protecting a confidentiality of the session, and wherein protecting the second security of the session includes protecting an integrity of the session; and
    sending the protected data of the session to the access network node.

2. The security implementation method of claim 1, wherein the security policy comprises a first bit and a second bit, wherein the first bit indicates whether the first security needs to be protected, and wherein the second bit indicates whether the second security needs to be protected.

3. The security implementation method of claim 1, wherein obtaining the at least one key comprises:
    deriving an intermediate key based on a first parameter and base keys; and
    generating the first key based on the user plane encryption algorithm identifier and the intermediate key or generating the second key based on the user plan integrity protection algorithm identifier and the intermediate key.

4. The security implementation method of claim 3, further comprising obtaining the base keys after successfully performing a bidirectional authentication between the apparatus and an authentication node.

5. The security implementation method of claim 3, wherein the first parameter includes at least one of an identifier of the access network node, a non-access stratum (NAS) counter, a first sequence number for generating the intermediate key, a second sequence number of a packet, a nonce, a bearer identifier, a flow identifier, a policy set, or a slice identifier.

6. The security implementation method of claim 1, wherein the at least one key comprises the first key and the second key, and wherein performing the security protection comprises protecting the first security of the session data using the first key and protecting the second security of the session data using the second key.

7. An apparatus comprising:
a processor coupled to a memory storing instructions and configured to execute the instructions to cause the apparatus to:
  obtain a security policy of a session between the apparatus and an access network node, wherein the security policy of the session indicates a protection mode of the session;
  obtain at least one key, wherein the at least one key comprises a first key or a second key, wherein the first key is based on a user plane encryption algorithm identifier, and wherein the second key is based on a user plan integrity protection algorithm identifier;
  perform, based on the protection mode, security protection on session data of the session using the at least one key to obtain protected data of the session, wherein performing the security protection comprises protecting first security of the session data using the first key or protecting second security of the session data using the second key, wherein protecting the first security includes protecting a confidentiality of the session, and wherein protecting the second security of the session includes protecting an integrity of the session; and
  send the protected data of the session to the access network node.

8. The apparatus of claim 7, wherein the security policy comprises a first bit and a second bit, wherein the first bit indicates whether the first security needs to be protected, and wherein the second bit indicates whether the second security needs to be protected.

9. The apparatus of claim 7, wherein the processor is further configured to execute the instructions to cause the apparatus to:
  derive an intermediate key based on a first parameter and base keys; and
  generate the first key based on the user plane encryption algorithm identifier and the intermediate key or generate the second key based on the user plane integrity protection algorithm identifier and the intermediate key.

10. The apparatus of claim 9, wherein the processor is further configured to execute the instructions to cause the apparatus to obtain the base keys after successfully performing a bidirectional authentication between the apparatus and an authentication node.

11. The apparatus of claim 9, wherein the first parameter includes at least one of an identifier of the access network node, a non-access stratum (NAS) counter, a first sequence number for generating the intermediate key, a second sequence number of a packet, a nonce, a bearer identifier, a flow identifier, a policy set, or a slice identifier.

12. The apparatus of claim 7, wherein the at least one key comprises the first key and the second key, and wherein performing the security protection comprises protecting the first security of the session data using the first key and protecting the second security of the session data using the second key.

13. A non-transitory storage device configured to store instructions, which when executed by a processor of an apparatus, cause the apparatus to:
  obtain a security policy of a session between the apparatus and an access network node, wherein the security policy of the session indicates a protection mode of the session;
  obtain at least one key, wherein the at least one key comprises a first key or a second key based, wherein the first key is based on a user plane encryption algorithm identifier, and wherein the second key is based on the user plane integrity protection algorithm identifier;
  perform, based on the protection mode, security protection on session data of the session using the at least one key to obtain protected data of the session, wherein performing the security protection comprises protecting first security of the session data using the first key or protecting second security of the session data using the second key, wherein protecting the first security of the session includes protecting a confidentiality of the session, and wherein protecting the second security of the session includes protecting an integrity of the session, and
  send the protected data of the session to the access network node.

14. The non-transitory storage device claim 13, wherein the security policy comprises a first bit and a second bit, wherein the first bit indicates whether the first security needs to be protected, and wherein the second bit indicates whether the second security needs to be protected.

15. The non-transitory storage device of claim 13, wherein, when executed by the processor, the instructions further cause the apparatus to:
  derive an intermediate key based on a first parameter and base keys; and
  generate the first key based on the user plane encryption algorithm identifier and the intermediate key or generate the second key based on the user plane integrity protection algorithm identifier and the intermediate key.

16. The non-transitory storage device of claim 15, wherein, when executed by the processor, the instructions further cause the apparatus to obtain the base keys after successfully performing a bidirectional authentication between the apparatus and an authentication node.

17. The non-transitory storage device of claim 15, wherein the first parameter includes at least one of an identifier of the access network node, a non-access stratum (NAS) counter, a first sequence number for generating the intermediate key, a second sequence number of a packet, a nonce, a bearer identifier, a flow identifier, a policy set, or a slice identifier.

18. The non-transitory storage device of claim 15, wherein the at least one key comprises the first key and the second key, and wherein performing the security protection comprises protecting the first security of the session data using the first key and protecting the second security of the session data using the second key.

* * * * *